Jan. 9, 1940. R. R. HAUGH 2,186,196
EGG CANDLING MACHINE
Original Filed Aug. 31, 1934 14 Sheets-Sheet 4

Inventor
Raymond R. Haugh,
By:
Fisher, Clapp, Soans & Pond
Attys

Inventor:
Raymond R. Haugh

Jan. 9, 1940.                R. R. HAUGH                2,186,196
                         EGG CANDLING MACHINE
              Original Filed Aug. 31, 1934    14 Sheets-Sheet 6
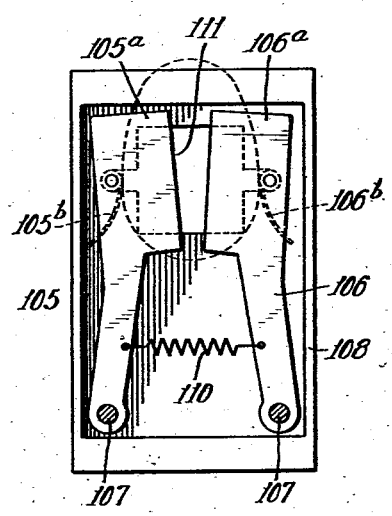
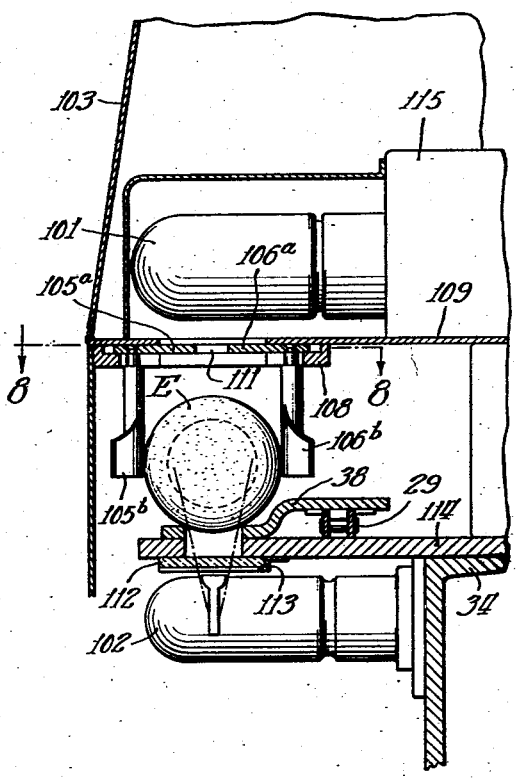
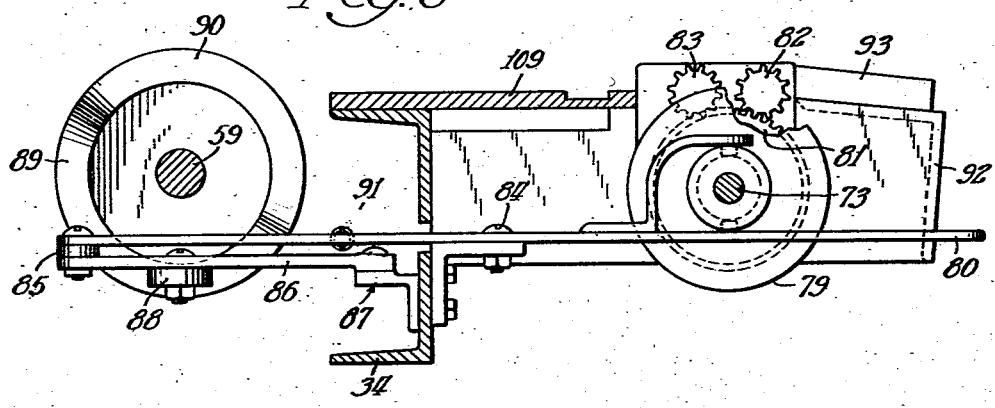
Inventor
Raymond R. Haugh.
By:
Fisher, Clapp, Soans & Pond
Attys.

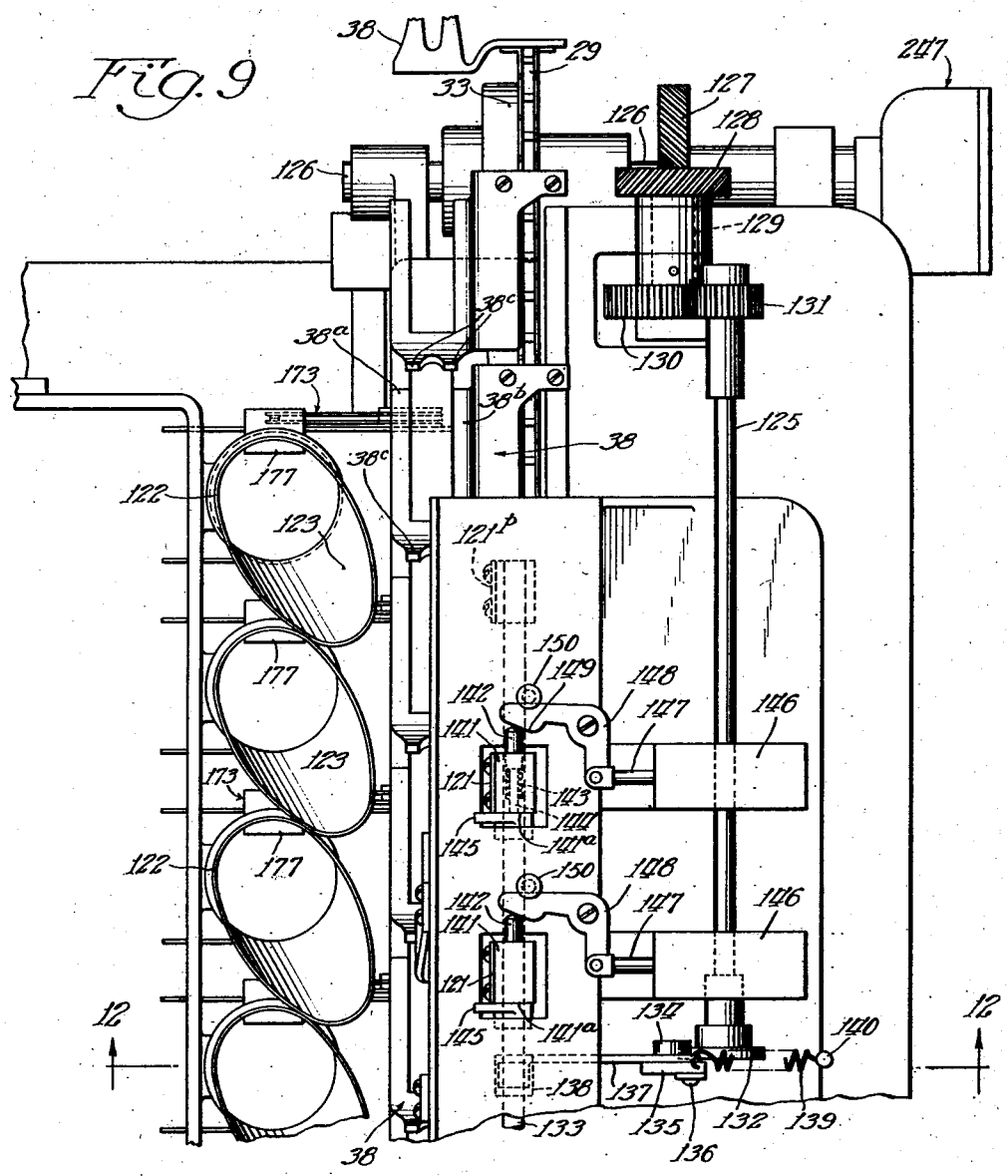

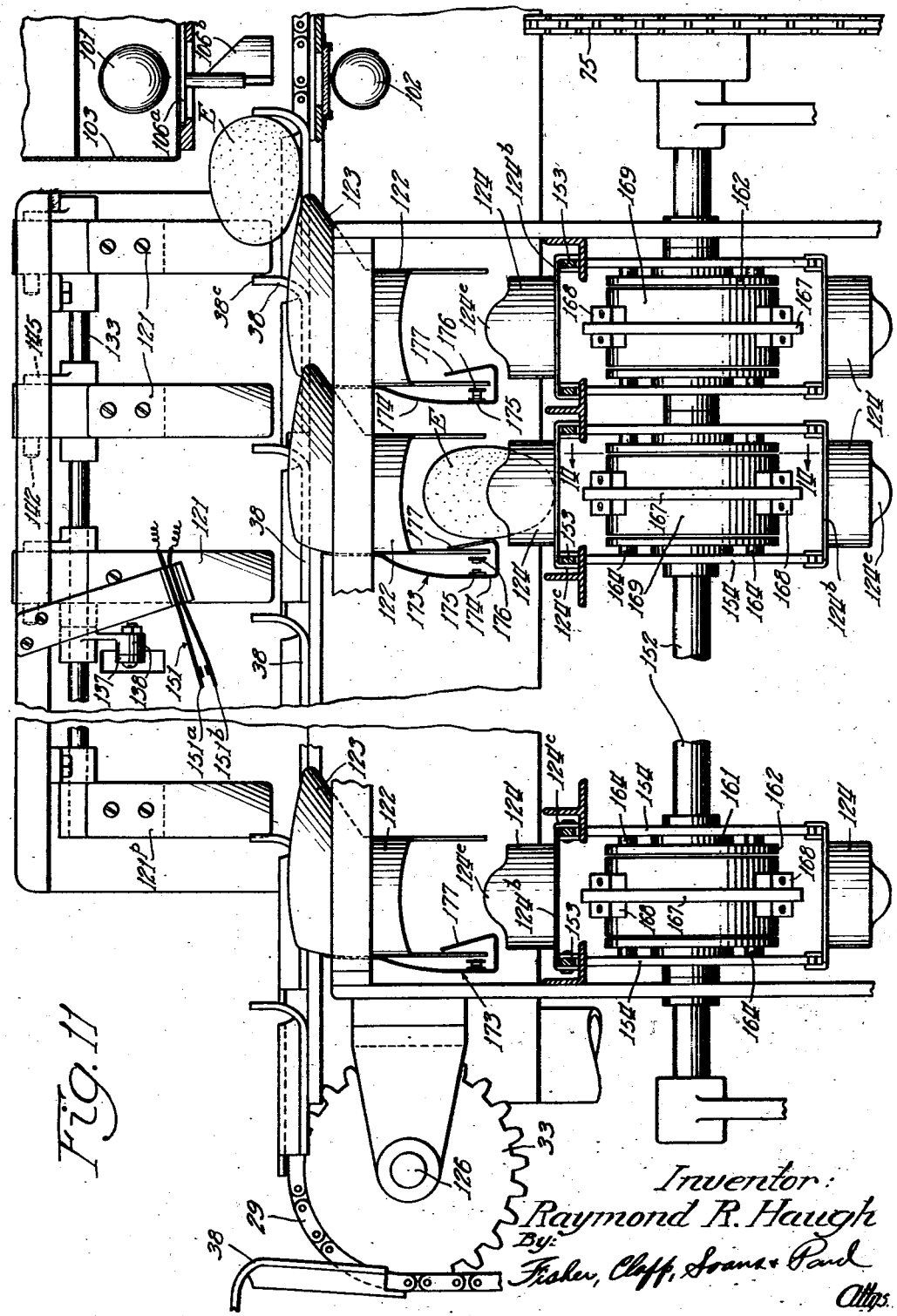

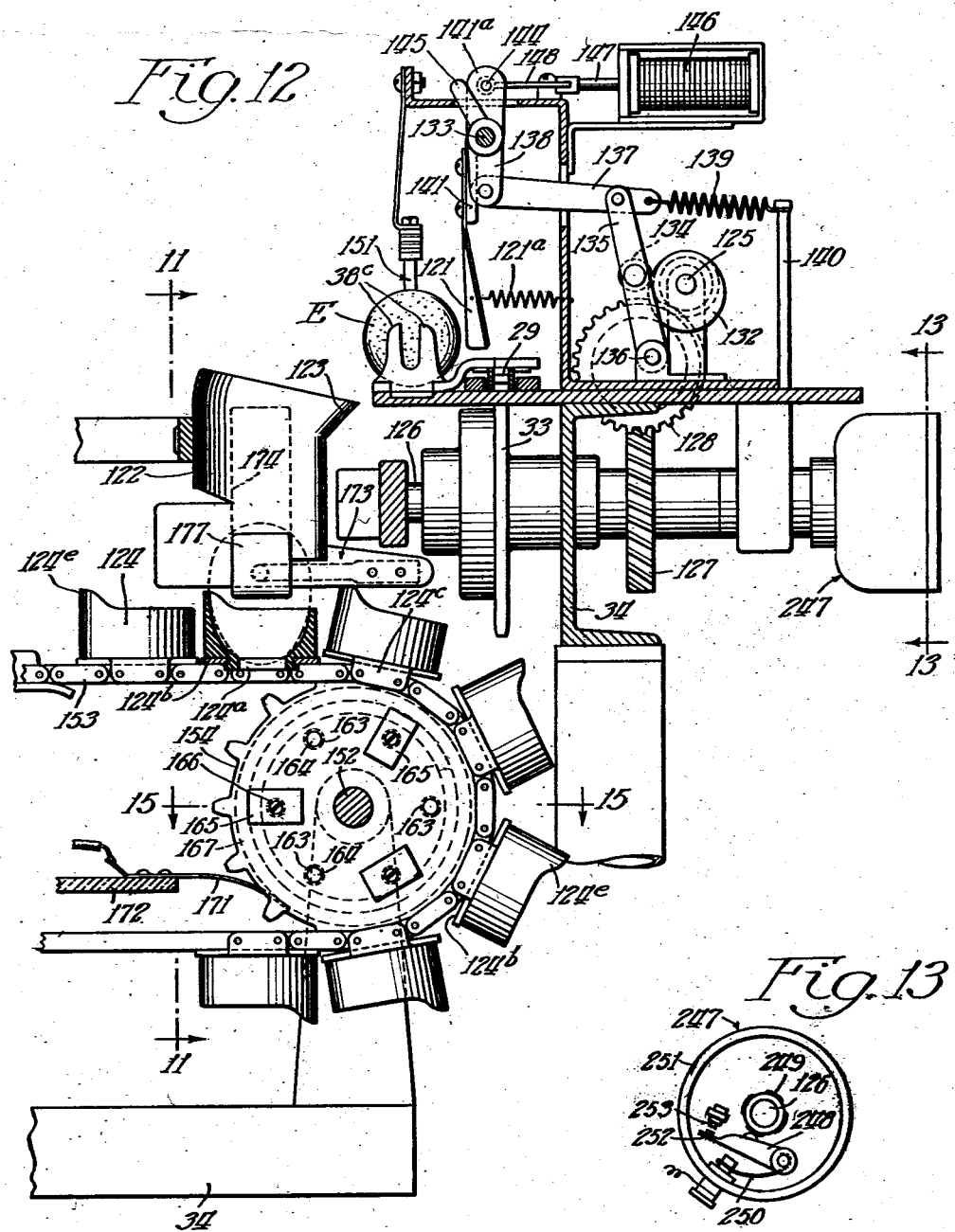

Inventor:
Raymond R. Haugh.
By: Fisher, Clapp, Soans & Pond
Attys.

Jan. 9, 1940.  R. R. HAUGH  2,186,196
EGG CANDLING MACHINE
Original Filed Aug. 31, 1934   14 Sheets-Sheet 11

Inventor:
Raymond R. Haugh.
By:
Fisher, Clapp, Soans & Pond
Attys.

Jan. 9, 1940.  R. R. HAUGH  2,186,196
EGG CANDLING MACHINE
Original Filed Aug. 31, 1934   14 Sheets-Sheet 12
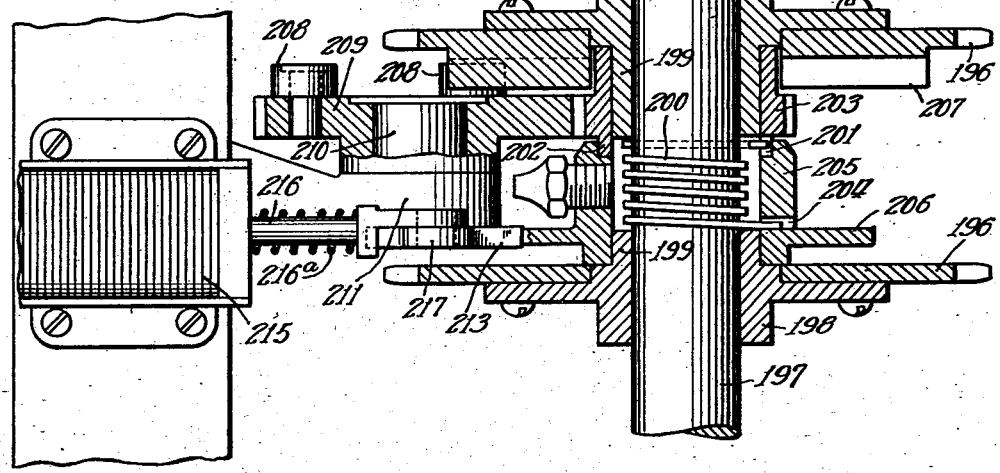
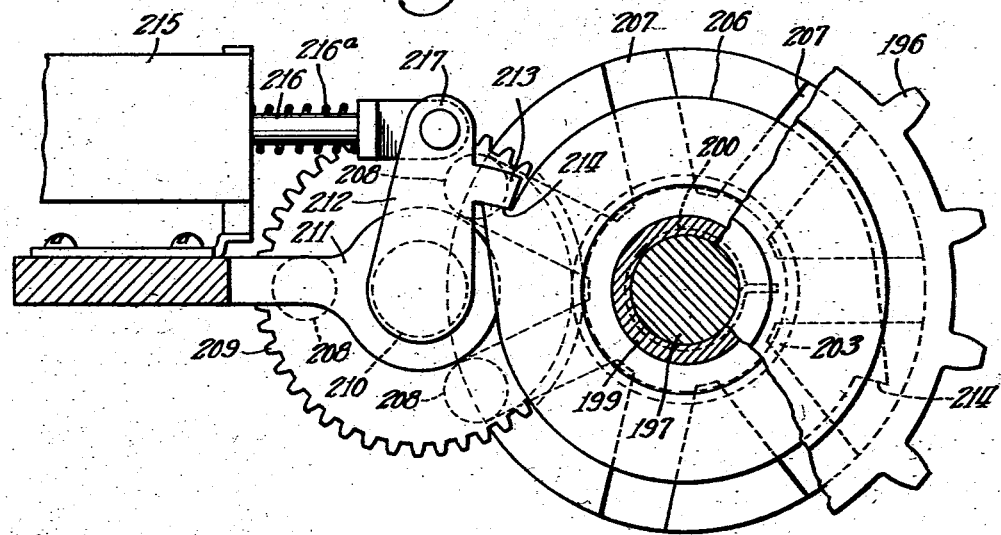
Inventor:
Raymond R. Haugh.
By:
Fisher, Clapp, Soans & Pond
Attys.

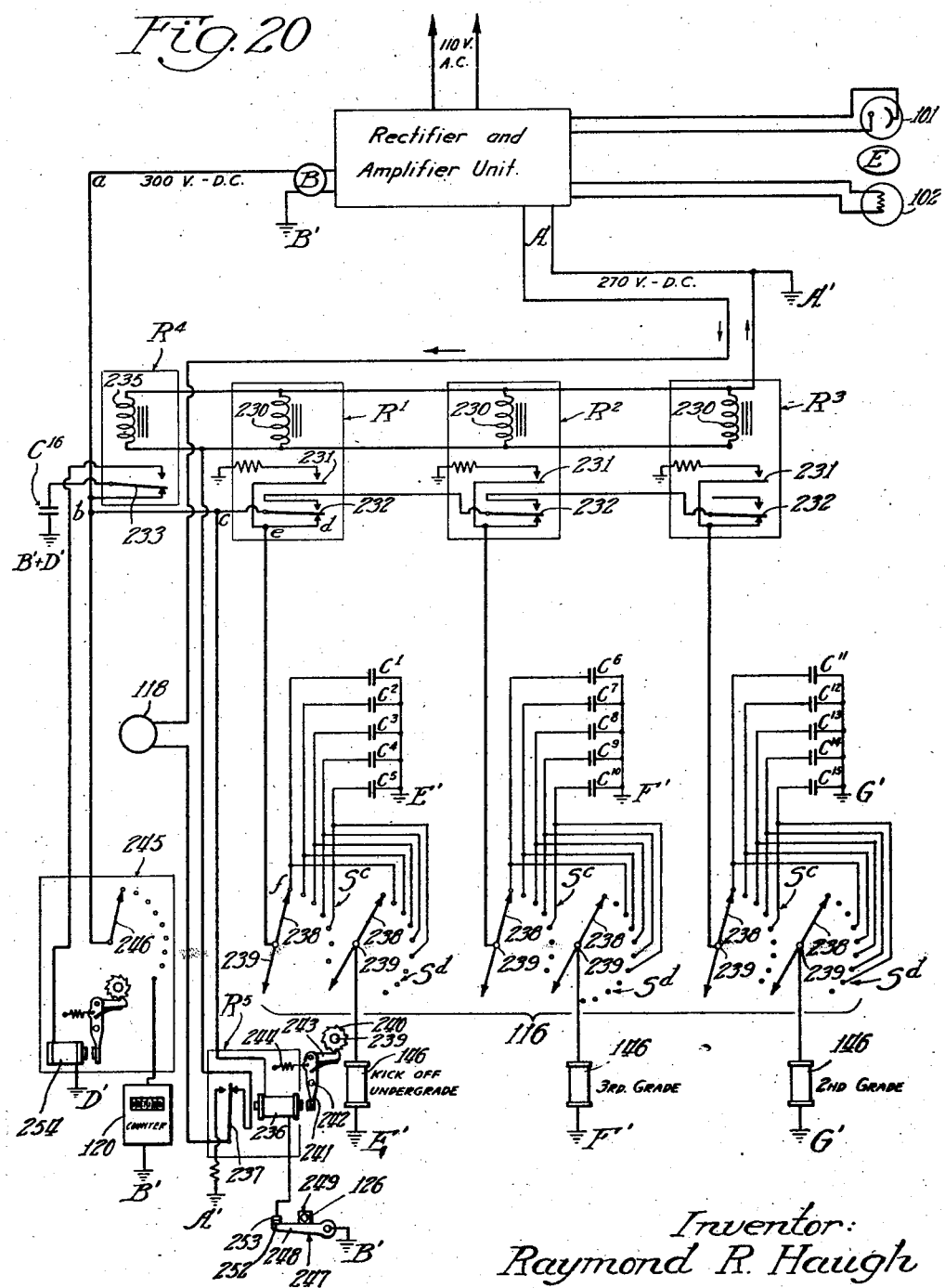

Jan. 9, 1940.    R. R. HAUGH    2,186,196
EGG CANDLING MACHINE
Original Filed Aug. 31, 1934    14 Sheets—Sheet 14
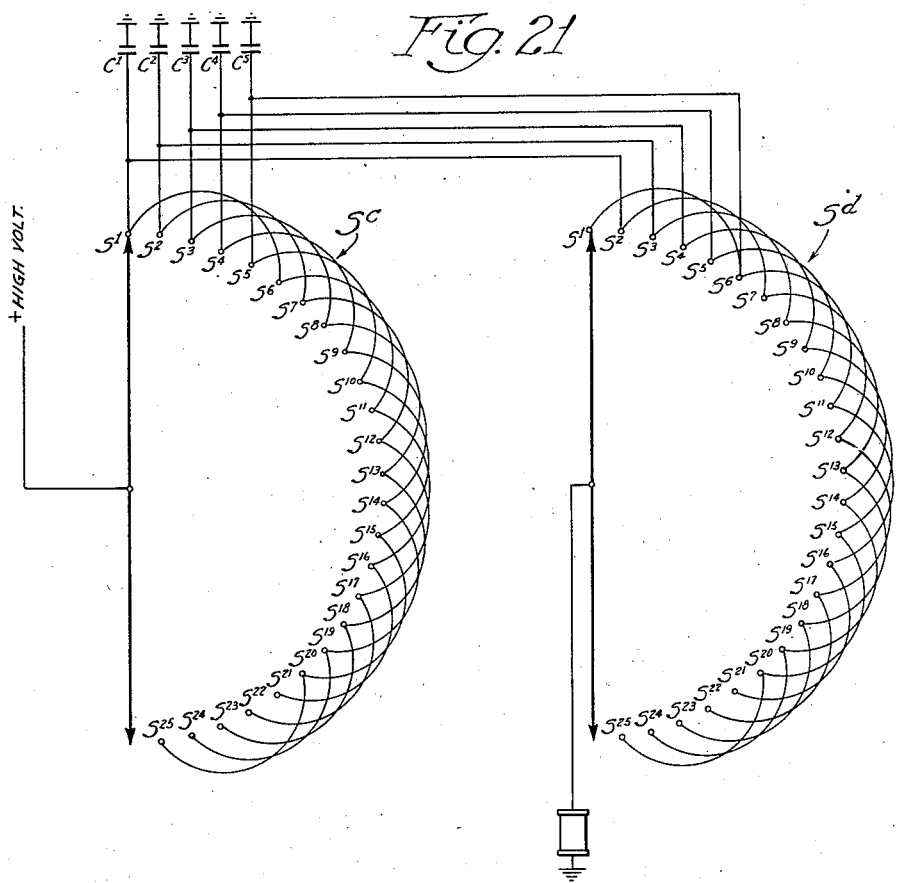
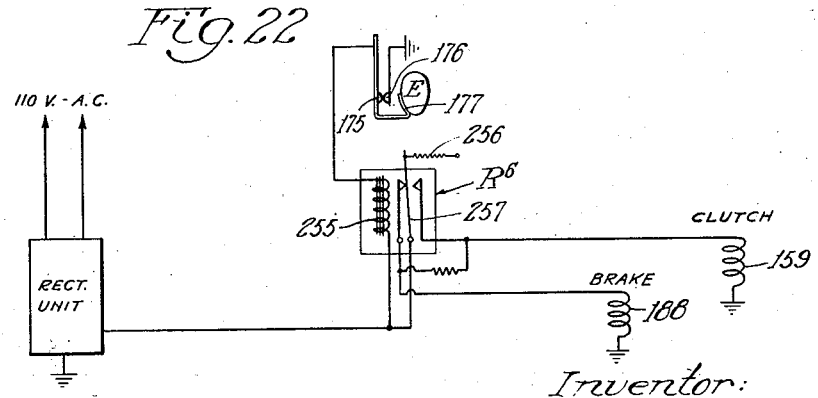

Patented Jan. 9, 1940

2,186,196

UNITED STATES PATENT OFFICE 2,186,196

EGG CANDLING MACHINE

Raymond R. Haugh, Chicago, Ill., assignor, by mesne assignments, to Kraft-Phenix Cheese Corporation, Chicago, Ill., a corporation of Delaware Original application August 31, 1934, Serial No. 742,223. Divided and this application April 23, 1936, Serial No. 75,982

5 Claims. (Cl. 209—111)

This invention relates to improvements in egg candling machinery, that is to say, to improvements in machines for inspecting and grading eggs according to their quality, based on certain characteristics which I have found are determinative of the quality and grade of eggs, and this application is a division of my copending application Serial No. 742,223 filed August 31, 1934.

It is generally understood that a fresh, high-grade egg is possessed of a white or albuminous part which is fairly thick. With increased age, the white of the egg becomes thinner and the yolk tends to rise to the top of the egg. This circumstance is utilized to advantage in the mechanism about to be explained.

Grading of eggs also takes into consideration the size of the air cell which is always formed at one end of the egg, cleanliness of the egg, checks or cracks, especially those which are normally invisible to the naked eye, and miscellaneous spots, such as blood spots, which are sometimes formed in the egg.

The size of the eggs is also an important consideration. The highest grade eggs are not only clean and fresh and free from checks or blood spots, but they are also eggs of a minimum size. For practical purposes, eggs may be graded according to three sizes, for example, small, which may be 41.5 mms. or less and weigh approximately 22 oz. per dozen; medium, between 41.5 mms. and 42.5 mms. and averaging 24 oz. per dozen, and large, which measure 42.5 mms. and over and weigh an average of 25 oz. and over per dozen.

The conventional method of inspecting eggs prior to this invention has been by placing each egg in front of a suitable light and then visually checking the egg to determine the condition of the white and other elements supposed to be determinative of its quality, such inspection being essentially a visual inspection. Some candlers also endeavor to base their judgment on the mobility of the yolk, as ascertained by watching the movement of the yolk after spinning and stopping the rotation of the egg. This form of inspection is of course wholly dependent upon the judgment of the egg candler, and actual tests have indicated that the same batch of eggs is practically never graded the same by different candlers.

The main objects of the present invention are to provide mechanism which will facilitate the making of a preliminary or visual inspection of eggs for so-called dirties, checks, blood spots, air cell size, and other characteristics which are normally determined in the conventional visual candling of eggs; to provide mechanism for automatically determining the quality of an egg according to condition, i. e., the density of its white and the resultant location of its yolk; to provide means for automatically separating the inspected eggs according to the grade as determined by the condition of the whites and location of the yolks; and to provide mechanism for automatically separating first grade eggs according to their size.

Other objects of the invention are to provide egg inspecting and grading mechanism which will make possible the inspection and grading of a much larger volume of eggs, person for person, in a given time than has been possible by existing methods of inspection; and to provide inspecting means as above indicated which will eliminate substantially all the errors in judgment which are prevalent in methods of inspection heretofore extant.

Still further objects are to provide mechanism of the character indicated which may be economically produced, operated and maintained, especially when due consideration is given to the volume of work handled by the mechanism, and to produce a machine of the character indicated which may be operated by persons relatively unskilled in the egg candling art.

Other objects and advantages of the present invention will be understood by reference to the following specification and accompanying drawings (14 sheets) wherein there is illustrated an egg candling machine embodying a selected form of the invention.

In the drawings—

Fig. 6 is a section on the line 6—6 of Figs. 2 and 4;

Fig. 7 is a section on the line 7—7 of Figs. 1 and 2;

Fig. 8 is a section on the line 8—8 of Fig. 7;

Fig. 9 is a fragmentary plan corresponding to a portion of Fig. 1, certain cover elements being removed to expose and more clearly illustrate some of the working parts;

Fig. 10 is a section showing a detail of construction of a part appearing in Fig. 9;

Fig. 11 is a side view corresponding in part to a portion of Fig. 2 but on an enlarged scale and including other mechanism in section. The location of this view is indicated approximately by the lines 11—11 of Figs. 3 and 12;

Fig. 12 is a section on the line 12—12 of Fig. 9;

Fig. 13 is a section on the line 13—13 of Fig. 12;

Figure 14:
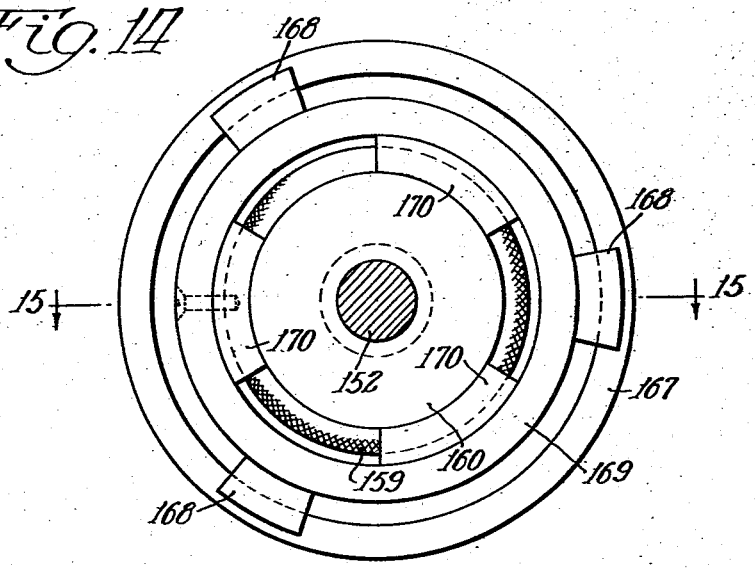
Fig. 14 is a section on the line 14—14 of Figs. 11 and 15.
Figure 15:
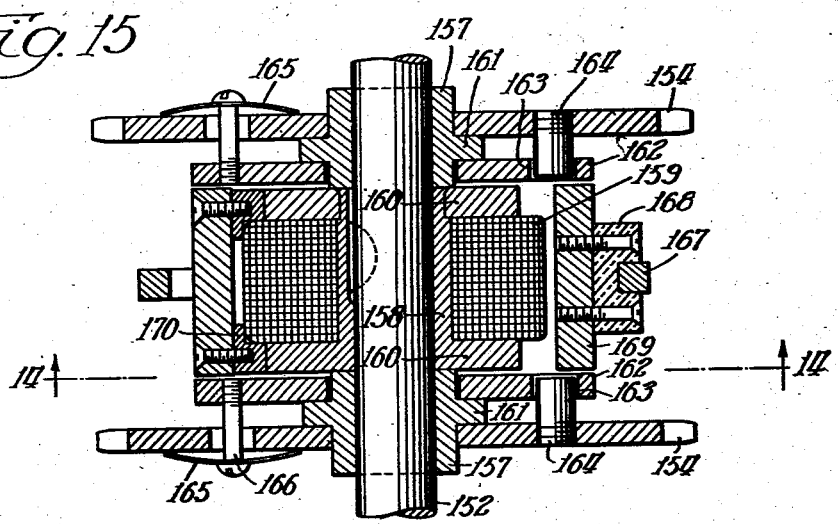
Fig. 15 is a section on the line 15—15 of Figs. 12 and 14.
Figure 16:
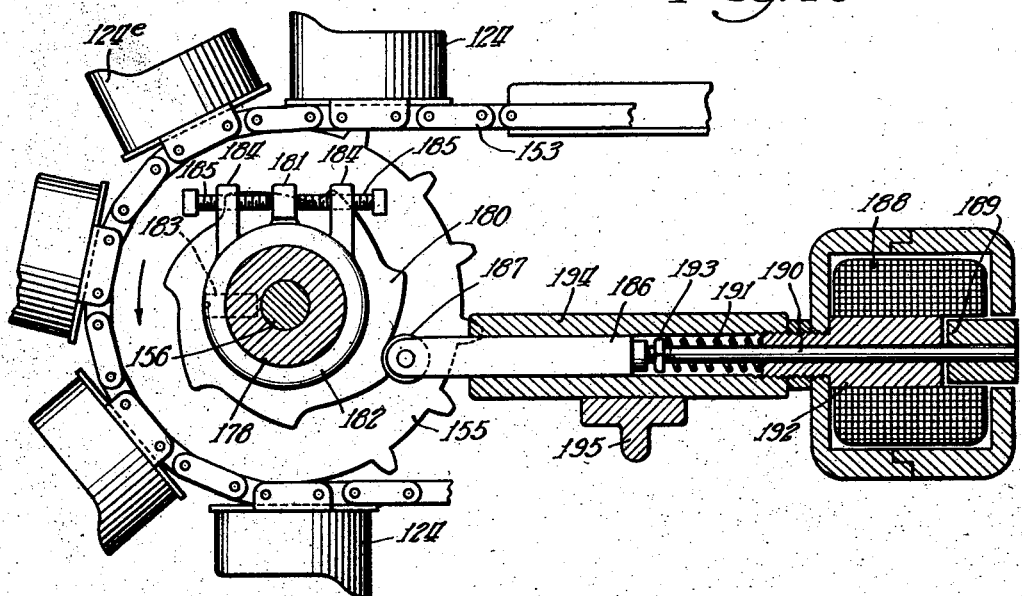
Fig. 16 is a section approximately on the line 16—16 of Fig. 1 and on the line 16—16 of Fig. 17.
Figure 17:
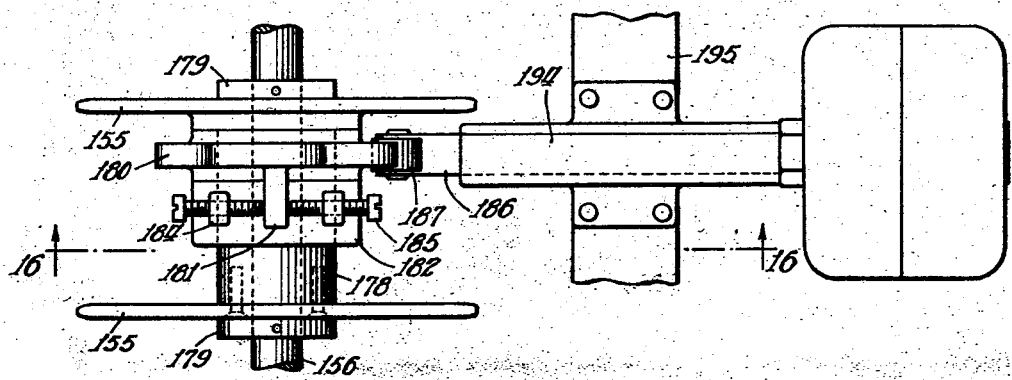
Fig. 17 is a detail plan of the mechanism illustrated in Fig. 16.

Figs. 18 and 19 are illustrations corresponding to Figs. 16 and 17 respectively, but showing a modified form of mechanism which also serves the functions of the mechanism shown in Figs. 14 and 15;

Fig. 20 is an electric circuit diagram;

Fig. 21 is an electric circuit diagram which illustrates more fully certain connections indicated in Fig. 20; and Fig. 22 is an electric circuit diagram relating to the operation of conveyors for receiving eggs as delivered by the mechanism according to grade and size.

General operation

Figure 1:
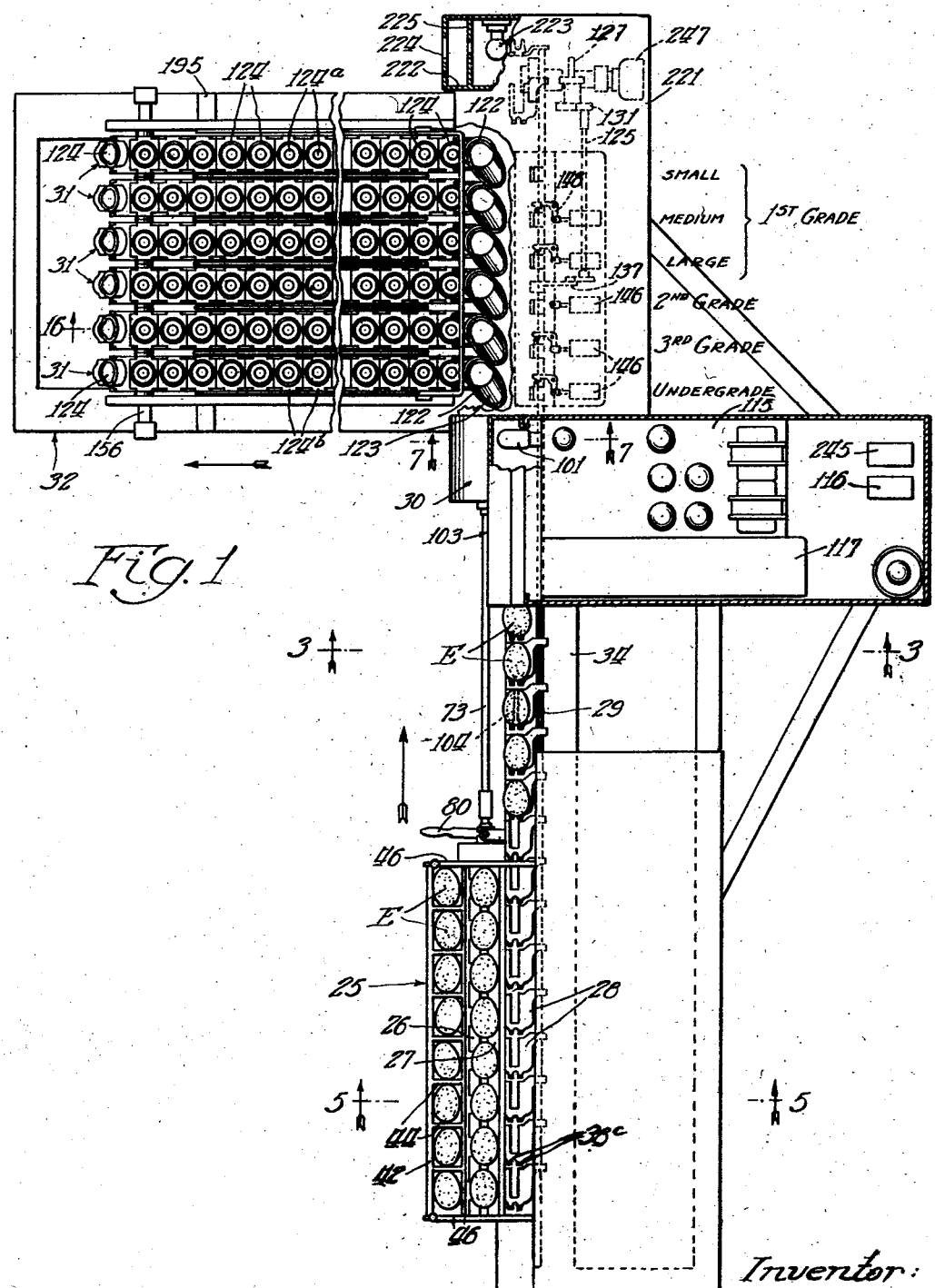
Fig. 1 is a plan.

Referring now to the drawings, and especially to Fig. 1, there is indicated at 25 a rack which is designed to be loaded with eggs by an operator of the machine. The rack 25 is reciprocated transversely of its length and serves to convey eggs placed therein to seats provided in a pair of rolls 26 and 27. The rolls 26 and 27 are suitably rotated in the same direction and serve to cause the eggs to rotate. Lights are arranged beneath the rolls 26 and 27 and in such a manner as to project a beam of light through the rotating egg. Eggs under rotation on the rolls 26 and 27 and in the path of the said beam of light, are subjected to a preliminary visual inspection at this stage. The visual inspection here possible is designed to enable the machine operator to pick out eggs which are ordinarily classified as dirties, checks, blood spots, and such other defects as are made readily noticeable by the light beam. At this stage, eggs having extremely thin whites may also be easily detected and removed, by reason of a very noticeable change in the position of the yolk and the extreme transparency of the white, but this element of inspection is not important and the possibility of making it at this stage is not relied upon for the grading of such eggs. The size of air pockets in eggs may also easily be determined in this visual inspection and eggs which have air pockets of too large size may be manually removed.

The rack 25 is also operative to feed the row of eggs from the rollers 26 and 27 to a conveyor which consists mainly of egg holders 28 mounted on and carried by a chain 29.

The eggs upon delivery to the conveyor 29 are carried forward in the direction of the rows of eggs by continuous movement. The transverse reciprocating movement of the rack 25 is synchronized with the travel of the conveyor 29 and egg holders 28 so that when the rack is moved transversely, it is operative to feed eggs from the rolls 26 and 27 to the egg holders 28. It is thus unnecessary to interrupt the travel of the conveyor 29 so that the speed of operation of the machine may be maintained at a minimum, depending largely upon the ability of an operator to supply eggs to the rack 25.

The conveyor 25 carries the eggs through inspecting mechanism indicated in its entirety by 30, such inspecting mechanism being, in this instance, of a photo-electric cell type of mechanism similar to that disclosed in my pending applications Serial No. 676,774, filed June 21, 1933, and Serial No. 683,161, filed August 1, 1933.

The conveyor next carries the eggs into the discharging mechanism which is controlled in part by the photo-electric inspecting mechanism and serves to separate the eggs according to classification. In the present instance, there are illustrated six receiving conveyors each designated 31. These conveyors are independently actuated and each moves forward one step for each egg delivered thereto. The conveyors 31 are in this instance designed to receive eggs classified or graded as "under grade," "third grade," "second grade," and large, medium and small "first grade" eggs, as labeled in Figs. 1 and 2.

The frame work of the mechanism may be extended as indicated at 32 at the delivery end of the conveyors 31, to provide a support for egg boxes or for crates for receiving the most prevalent grade of eggs. Other crates for the grades not expected to be found in large numbers in the particular egg lot under inspection may be located at other convenient points. An operator is of course stationed at the machine to load eggs into the rack 25, and another operator is stationed at the delivery end of the machine for removing the eggs from the conveyors 31 and depositing them in boxes or crates, as may be required. Of course, other suitable stands or racks may be provided, either as a part of or independent of the apparatus for holding crates or boxes from which and into which the eggs may be taken or packed.

Receiving mechanism and preliminary inspection

The egg conveying chain 29 extends around sprockets designated 33 which are suitably rotatably mounted on frame work which is indicated by the reference numeral 34. The frame work may of course be of any suitable construction and may consist of various supporting legs or brackets such as are required for the purposes of the mechanism. The chain 29 is driven in this instance by means of an electric motor 35 having a suitable driving connection with one of the sprockets 33 which carry the chain 29. In this instance, the driving connection includes a worm and worm wheel speed-reducing unit indicated at 36 and a chain drive connection 37 between the drive end of the speed-reducing unit and the shaft of the sprocket 33.

Figure 4:
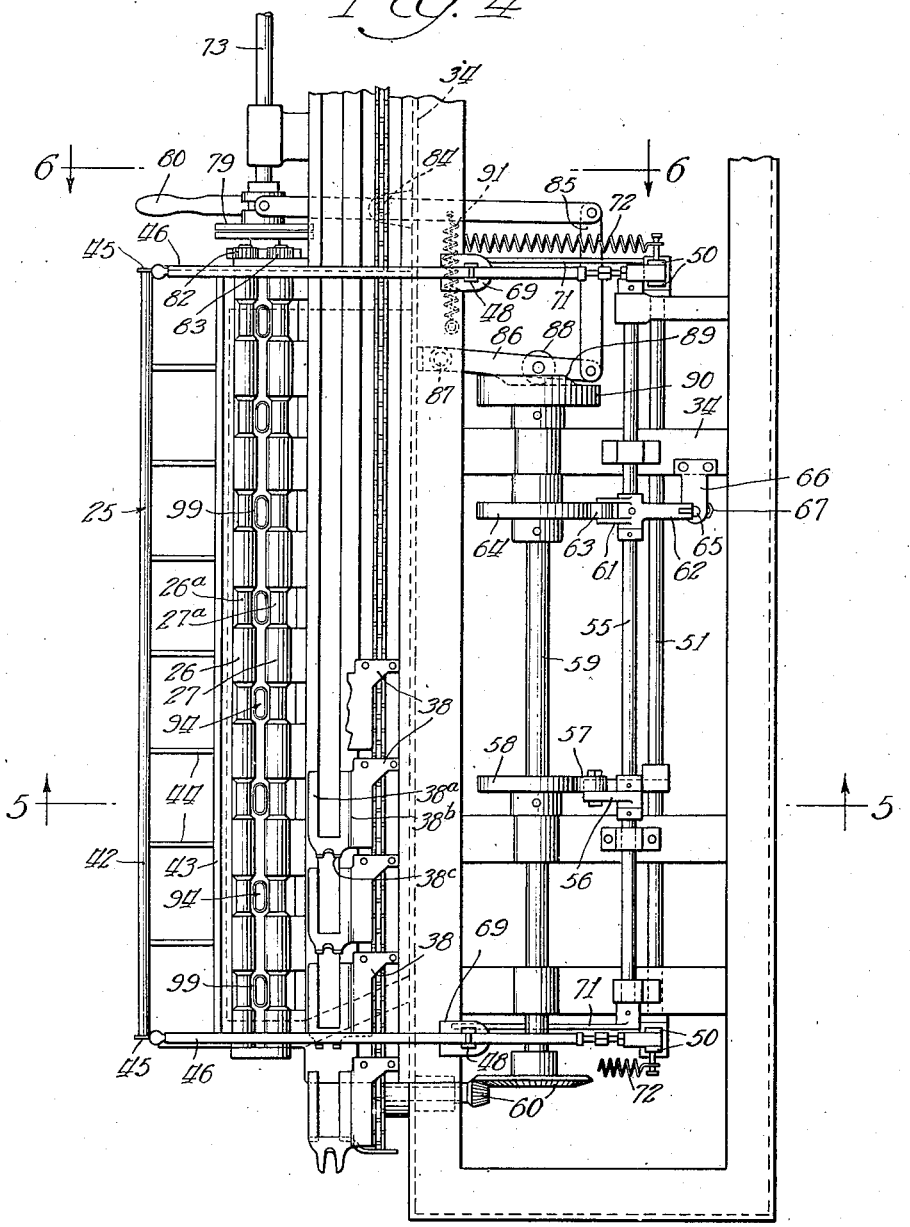
Fig. 4 is a fragmentary plan corresponding to a portion of Fig. 1, certain cover elements being removed to expose and more clearly illustrate the working parts.
Figure 5:
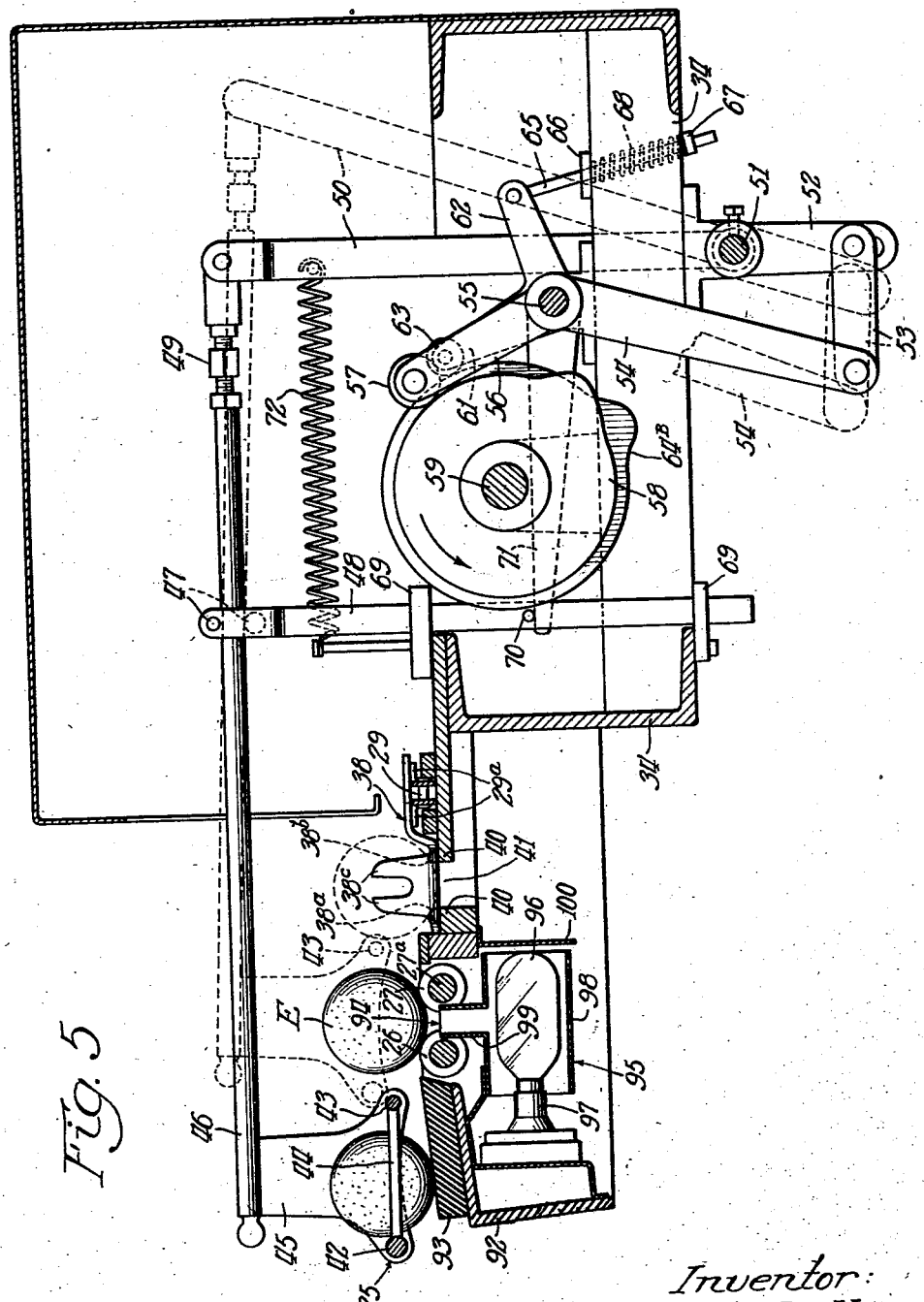
Fig. 5 is a section on the line 5—5 of Figs. 1 and 2.

The chain 29 carries a series of regularly spaced egg holders 38, the detail construction of which is clearly shown in Figs. 4 and 5. As shown in said figures, the egg holders each comprise longitudinally extending but transversely spaced leg portions 38$^a$ and 38$^b$. The portion 38$^b$ is somewhat wider than the other leg and includes an upwardly offset portion which is provided at its forward end with a lip or extension 38$^c$ which is connected to the chain 29. The connection to the chain 29 may be through the agency of ears such as indicated at 29ª formed integrally with certain links of the chain. The egg holders 38 ride on supporting elements indicated at 40 (Fig. 5) between which elements there is provided a slot designated 41.

The rack 25 consists of longitudinally extending front and back bars 42 and 43 respectively, these bars being connected by longitudinally spaced separating bars 44. At their ends, the bars 42 and 43 are also connected by means of bracket plates designated 45. The rack 25 is rigidly connected through the agency of said end brackets 45, 45 to transversely extending rods 46, 46 which are guided intermediate their lengths between pairs of rollers 47 carried by vertically movably mounted posts 48. The rear ends of the rods 46 are pivotally connected by means of adjustably connecting devices 49 to the upper ends of arms 50 which are rigidly mounted on and extend upwardly from a rock shaft 51. The rock shaft 51 is journaled in suitable bearings carried by conveniently located frame parts 34. Intermediate its ends, the rock shaft 51 is provided with a depending arm 52 rigidly connected to the rock shaft and the free end of said arm is connected by means of a link 53 to the free end of the depending arm 54 of a bell crank lever which is rockably mounted on another rock shaft 55. The said bell crank also includes an upwardly extending arm 56 which is equipped with an anti-friction roller 57 at its free end for engagement with the periphery of a rotary cam 58. The cam 58 is carried by a cam shaft 59 which is driven in predetermined synchronized relation to the feed movement of the conveyor chain 29 through the agency of a bevel gear connection indicated at 60, with one of the sprockets 33 of the conveyor chain 29. The rock shaft 55 is journaled in suitable bearings carried by conveniently located frame parts 34 and it is also provided with a bell crank comprising an upstanding arm 61 and a laterally extending arm 62. The upstanding arm 61 is provided with an anti-friction roller 63 which engages the periphery of a rotary cam 64 which is carried by said cam shaft 59. The laterally extending bell crank arm 62 has pivotally connected to it a rod 65 which depends through an aperture in a guide plate 66 which is fixedly mounted on the frame part 34. Adjacent its lower end, the rod 65 is equipped with a collar 67 and a coil spring 68 is interposed between the guide member 66 and the collar 67 to cushion the operation of certain of the parts, as will hereinafter be explained.

The vertically adjustably mounted posts 48 are slidable in supporting brackets 69, 69 and they are provided with cross pins 70 which engage the upper edges of the lifting arms 71 which are mounted on the rock shaft 55.

It will be seen that as an incident to the rotation of the cam 58, the arms 50 and hence the rods 46 and the rack 25 will be reciprocated transversely. Inward movement of the rack is against the tension of springs 72 which are stretched between the arms 50 adjacent their upper ends and anchoring pins carried by the frame work of the machine. The springs 72 of course serve to return the egg rack 25 to its outermost position, as shown in full lines in Fig. 5, when permitted to do so by the cam 58. Also, rotation of the cam 64 acting through the bell crank arm 61 imparts rocking movement to the rock shaft 55, which in turn causes a rocking of the lifting arms 71 to effect vertical movement of the supporting posts 48. It will be apparent that the egg rack 25 will thus be caused to swing upwardly. The relationship of the cams 58 and 64 is such that the rack 25 is first moved inwardly in an approximately horizontal plane to substantially the position indicated in broken lines in Fig. 5. Thereupon, the cam 64 causes upward swinging movement of the rack 25 so that the bar 43 will be elevated above the tops of a row of eggs indicated at E, which were fed to the rollers 26 and 27 by the rack 25 as an incident to its inward movement. The cam 58 then permits the springs 52 to return the rack 25 to its outermost position, the cam 64 also permitting lowering of the rack to its initial position in such a manner that the rack will not on its outward movement engage the eggs deposited on the rollers 26 and 27.

Figure 3:
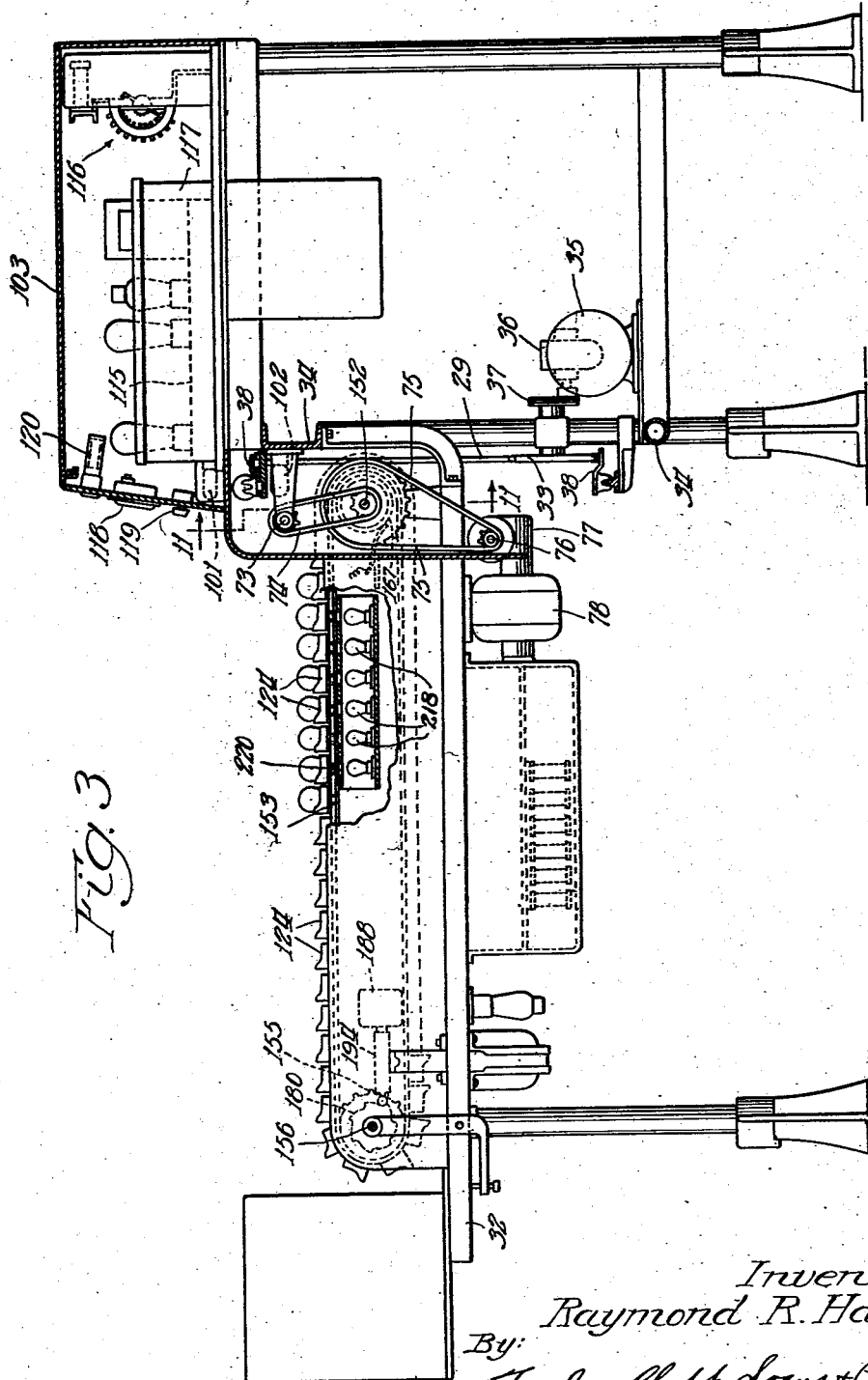
Fig. 3 is a section on the line 3—3 of Figs. 1 and 2.

The rolls 26 and 27 are intermittently rotated in the same direction and are driven by means of a connection to a shaft 73 which is continuously driven by means of chain connections 74 and 75 with the power shaft 76 of a speed reducing unit 77 which is suitably connected to an electric motor 78. The motor 78, as shown in Fig. 3, is mounted on a frame portion 34 and it will of course be understood that suitable sprockets, as indicated in the drawing, are provided for receiving the chains 74 and 75 and for transmitting rotation to the respective shafts on which the sprockets are mounted, at predetermined speeds of rotation. The shaft 73 is connected to the rollers 26 and 27 through the agency of a clutch device 79 which is adapted to be adjusted from engaged to disengaged relation through the agency of an operating lever 80. The driven end of the clutch 79 is provided with a gear 81 which meshes with similar pinion gears 82 and 83 which are respectively secured to the shafts or rollers 26 and 27.

The clutch 79 may be manually controlled through the agency of the lever 80 which is pivoted, as indicated at 84, on a suitable bracket carried by a frame part, but it is preferred that the said clutch be automatically engaged and disengaged in synchronized relation with the transverse movement of the egg rack 25. To automatically control the clutch 79, the clutch operating lever 80 is extended rearwardly beyond its pivot 84 and is connected by means of a link 85 to the free end of an arm 86 which has its other end pivoted, as indicated at 87, to a suitable bracket carried by a frame part. Intermediate its length, the arm 86 is provided with a roller 88 which is operative to engage the cam face 89 of a cam disk 90 which is secured to the cam shaft 59 (see Figs. 4 and 6). A spring 91 extending between a portion of the clutch operating lever 80 and a portion of the frame 34 normally tends to disengage the clutch 79, and the cam 89 is operative to effect and maintain engagement of the clutch for the desired length of time and in properly synchronized relation with the movements of the egg rack 25.

Underlying the egg rack 25 when in its outermost position, there is provided a support 92 provided on its upper surface with a cushion strip 93 preferably in the form of a strip of rubber. The said cushion strip is designed to support eggs placed within the pockets formed in the rack 25.

By reference to Fig. 4, it will be seen that each of the pockets formed between the cross bars 44 of the rack 25 are transversely aligned with recessed or grooved portions designated 26ª and 27ª respectively of the rollers 26 and 27. In the enlarged spaces 94 thus formed between the rollers 26 and 27 are located devices 95 for projecting a beam of light into the eggs which are fed to the rollers 26 and 27 by the rack 25. By reference to Figs. 1 and 4, it will be understood that eggs when supported on the rollers 26 and 27 are substantially centrally located with respect to the spaces 94, so that a beam of light issuing from the devices 95 will illuminate the eggs and thereby permit visual inspection thereof while the eggs are disposed on the rollers. The light devices 95 are shown in detail in Fig. 5 and consist of electric lamps 96 of suitable strength supported by sockets 97 suitably mounted under the support 92, which in this instance is illustrated as being formed of a length of angle iron. A housing for the lamp bulb 96 is indicated at 98 and is provided with an elongated or oval-shaped nozzle-like tube element 99 which serves to project a restricted beam of light from the lamp 96 through the overlying egg E. A baffle 100 may also be mounted across the end of the lamp housing 98 to prevent the spreading of light where it is not desired.

From the foregoing description, it will be understood that the operator places eggs in the pockets of the rack 25 and on the support 93. From that position, the rack 25 is moved inwardly and rolls the eggs therein to a position on the rollers 26 and 27 overlying the lighting devices 95. The rollers 26 and 27 are then rotated sufficiently to cause the eggs thereof to revolve two or three times, during which time the operator makes a preliminary visual inspection of the eggs similar to the inspection made by egg candlers in the conventional method of candling eggs.

While the egg is being rotated for the purpose of the preliminary visual inspection, the rack 25 is being elevated and returned to its initial position. Another batch of eggs is positioned in the rack and upon the next inward movement of the rack, the bar 43 thereof engages the row of eggs on the rollers 26 and 27 (which at that time are stationary), and causes the said row of eggs to roll inwardly and to roll into egg holders 38 which are in movement with the chain 29. The transverse movement of the rack 42 is accurately timed to cause the eggs E rolling from the rollers 26 and 27 to roll into the said egg holders 38 just in front of upstanding back elements 38ᶜ. The brightness of the lamps 96 may be controlled by means of a suitable rheostat or otherwise, so as to permit the lights to be adjusted to the particular liking of the operator or to suit the particular batch of eggs under inspection. Such a rheostat may be located in any convenient position and is therefore not shown. The eggs which appear, as a result of the visual inspection made by the operator, to be below certain standards, may of course be removed from the conveyor by hand.

*Photo-electric grading means*

The eggs carried forward by the conveyor chain 29 and holders 38 are carried between a photoelectric cell 101 and an exciter lamp 102 contained in a housing 103. In some instances, the eggs may be positioned on the egg holders 38 slightly in advance of the upstanding rack elements 38ᶜ thereof. For causing the eggs to rest against said upstanding back elements and thereby to assure accurate positioning of the eggs in the holders and maintaining predetermined timed relation between the operation of the photo-electric inspecting means and other elements of the mechanism, there is provided a yielding or spring element 104 which is suitably mounted and projects upwardly in the slot 41 and between the egg holder portions 38ª and 38ᵇ. When an egg engages the said spring finger 104, its forward movement is arrested until such time as it engages the rack elements 38ᶜ of the egg holders to be thereby positively propelled. Of course the spring finger 104 is of sufficiently light tension to permit the egg and egg holder to ride thereover without any upward movement being imparted to the egg or egg holder.

As best seen in Figs. 7 and 8, there is provided between the photo-electric cell 101 and exciter lamp, a shutter arrangement controlled by the eggs for restricting the passage of light from the exciter lamp to the photo-electric cell except through an egg carried by one of the egg holders 38.

The shutter arrangement comprises a pair of arms 105 and 106 each pivoted at one end, as indicated at 107, on a supporting plate element 108 which is suitably secured to the wall element 109 of the housing 103. At their opposite ends, the shutter members 105 and 106 are provided with enlargements 105ª and 106ª respectively, which have adjacent edges designed to engage each other when the shutters are in closed position, to thereby prevent the passage of light from the exciter lamp 102 to the photo-electric cell. A spring 110 stretched between the shutter arms serves to yieldingly urge the same to closed position. Flared guide elements 105ᵇ and 106ᵇ depend from the shutter members 105 and 106 respectively and are adapted to be engaged by an egg in its passage therebetween. As clearly shown in Figs. 7 and 8, an egg passing between the guide elements 105ᵇ and 106ᵇ causes a spreading or opening of the shutter members 105ª and 106ª, so that light emanating from the exciter lamp 102 and passing through the egg E and through the opening designated 111 between the shutters, may act upon the photo-electric cell to cause the passage of an electric current.

As previously indicated, the detail operation of the photo-electric cell inspecting mechanism is fully disclosed in my said copending applications and hence need not be herein described in detail. However, it may be pointed out that between the exciter lamp and the egg holders 38 there is provided a shield 112 which is removably held in position by means of a suitably flanged bracket 113 secured to the bottom side of the plate part 114 which is supported by the machine frame. The shield 112 serves to prevent the accumulation of grit and other forms of dirt on the surface of the exciter lamp so that cleaning of the latter is not often required. It will be understood that in the event that grit or other dirt is deposited on the surface of the exciter lamp, the heat generated by the lamp causes such material to be burned to the surface of the lamp and removed only with great difficulty. By the provision of the shield 112, it becomes a simple matter to remove the shield for cleaning or replacement.

Electric circuits controlled by the photo-electric cell will presently be described. For present purposes, it is sufficient to explain that currents passed by the photo-electric cell 101 are amplified by an amplifying unit designated 115 preferably located within the housing 103 and that the amplified current is distributed by means of an electrically actuated motor switch or distributor designated 116 to condensers contained in a receptacle 117. The details of construction of the amplifier, the motor switch or distributor and the condensers are not a part of the present invention, but these parts are conventional units available on the market. Hence they need not be described in detail. To facilitate the determination of the strength of current passed by the photo-electric cell, a milliamperemeter designated 118 is mounted on the front of the housing 103. For regulating the strength of such current, a knob 119 connected to a suitable instrument is located on said front panel and a counter 120 for indicating the number of eggs inspected by the photo-electric cell is also provided.

Grade separating mechanism

As previously indicated, the eggs are graded in accordance with their influence on the intensity of light which passes through the eggs and acts on the photo-electric cell 101. The present arrangement is such that those eggs which permit the passage of the greatest amount of light are graded as "first grade" and other eggs which pass successively diminished intensities of light are graded as "second," "third" and "under grade" eggs. Also, "first grade" eggs are further graded, according to size, into three groups, "small", "medium" and "large." The grading according to size is independent of the photo-electric cell arrangement.

From the egg holders 38 on the conveying chain 29, the eggs are discharged or kicked off by means of kicker arms such as indicated at 121 which are automatically rocked, as will presently be explained. The eggs discharged by the conveyor are guided by guides or chutes 122 which are provided at their upper ends with funnel-like enlargements 123 projecting in the direction from which the eggs approach the guides. The guides 122 serve to conduct the eggs downwardly and to deposit them in soft and resilient rubber cups 124 provided on the receiving conveyors 31. The receiving conveyors 31 are advanced step-by-step, one step for each egg deposited therein. It will be understood that the conveyors 31 are independently actuated each time an egg is deposited in one of the cups 124 thereof so that in each conveyor the cups are successively filled so as to provide full egg rows which facilitate further handling and packing, as will presently appear.

Referring now particularly to Figs. 9 and 12, it will be seen that there is provided a shaft 125 which is suitably journaled in brackets carried by the frame work of the machine and continuously rotated by means of a driving connection with the shaft of one of the sprockets 33 by which the conveyor chain 29 is propelled. The gear connection referred to, with the sprocket 33, appears in the upper lefthand corner of Fig. 2 and the said sprocket is carried by a shaft 126 which is suitably journaled in the machine. The sprocket 33 and shaft 126 are rigidly connected so that the rotation of the said sprocket is imparted to the shaft 126. The latter carries a helical gear 127 which meshes with another helical gear 128 having a shaft 129, to the other end of which is connected a gear 130. The gear 130 meshes with a gear 131 carried by the shaft 125 so that the latter is continuously driven in predetermined relation to the rotation of the sprocket 33 and in predetermined relation or synchronism with the egg conveyor 29. The shaft 125 is equipped with a cam 132 which is provided for imparting rocking movement to the kickers 121, all except the last of which are mounted for free rocking movement on a shaft 133. The shaft 133 is continuously rocked by means of a cam 132 through the agency of the following means: The cam 132 acts against an anti-friction cam follower 134 which is carried by an arm 135, the latter being pivoted at its lower end, as indicated at 136, to a stationary bracket. The upper end of the arm 135 is connected by means of a link 137 with the lower or free end of a short arm 138 which is secured to and depends from the rock shaft 133. A spring 139 acting between an extended end portion of the link 137 and an upstanding stationary pin 140 serves to maintain the cam follower 134 in engagement with the cam 132 so as to cause rocking movement of the shaft 133 in the direction opposed to that in which the cam 132 causes movement.

In the drawings, a last kicker which is fixedly mounted to the shaft 133 so as to be continuously rocked, is designated 121p. The other kickers 121 are carried by arms designated 141 which are journaled intermediate their ends on the shaft 133 and at their upper ends are provided with movable pins 142 disposed in axial parallel relation to the shaft 133. The pins 142 are normally urged to move outwardly by means of coil springs such as indicated at 143, which are recessed in the upper ends of the arms 141, the said pins being provided with reduced diameter portions 144 which are adapted to be projected from one side 141ª of the arms 141. Adjacent the side 141ª of each of the kicker arms 141, there is fixedly mounted on the shaft 133 an upwardly extending finger member 145. The finger members 145 rock continuously with the shaft 133 so that when a pin member 142 is moved against the pressure of the spring 143 so as to cause its reduced end 144 to project into the path of the finger 145, the corresponding kicker arm will be also rocked.

The pins 142 are moved endwise so as to cause the reduced end portions 144 thereof to project into the path of the fingers 145 by electrically actuated means including electro-magnetic devices such as solenoids indicated at 146. When a solenoid 146 is energized, it acts on its plunger 147 which is pivoted at its outer end to the end of one arm of a bell crank 148 (see Figs. 9 and 10). The other arm of each bell crank 148 is provided with a cam formation 149 at its outer end, said cam formation acting against the adjacent end of the pin 142. A stop pin 150 is provided for limiting outward movement of the bell crank under the influence of the spring 143, which normally urges the pin 142 against the said cam formation.

It will be seen that when a solenoid 146 is energized, the bell crank 148 will be swung in such a direction that the cam 149 will be moved inwardly so as to cause it to press the pin 142 inwardly, thereby to cause the reduced end portion 144 thereof to project in the path of movement of the finger 145. The latter position is illustrated in Fig. 10. Since the finger 145 is fast on the continuously rocked shaft 133, it will be apparent that engagement of the finger 145 with the pin 144 will effect rocking movement of the kicker arm with which the particular finger and pin are associated. A spring 121ª effects return movement of the kicker arm.

There are in the present disclosure five solenoids such as 146, three of them for discharging "under grade," "third grade" and "second grade" eggs respectively, and two of them for effecting discharge of "large" and "medium" sized "first grade" eggs. Solenoids for the first three mentioned grades are controlled by electric impulses passed by the photo cell inspecting means and the solenoids for the two "first grade" sizes are controlled by the egg sizes.

For determining the grade of eggs according to size, electric switches, such as indicated at 151, are provided. One such switch is provided for each of the "large" and "medium" classification of "first grade" eggs. As best shown in Figs. 11 and 12, the switches 151 are so arranged that they overlie the path of travel of eggs carried by the conveyor 29 and egg holders 38. The first switch 151 (see Fig. 2) is so arranged that eggs of a predetermined minimum size will cause the contact elements 151a and 151b to be closed by reason of engagement of the egg with the lower contact element 151b, which is of a sufficiently springy, flexible nature as to be adapted to be raised into contact with the member 151a merely by the egg under the switch. An electric circuit completed by contacting of the elements 151a and 151b of the switch controls the solenoid 146 for actuating the kicker 121 which is associated with the receiving conveyor 31 for the large "first grade" eggs. The other switch 151 is of the same construction but is set somewhat lower so that the next smaller size of eggs will close that switch to cause actuation of the corresponding kicker 121. As previously indicated, the last kicker designated 121p is at all times rocked so that any eggs which pass by both of the switches 151 will necessarily be discharged by said kicker in the last or small size receiving conveyor 31.

*Graded egg conveyors*

As previously indicated, for the six egg grades herein contemplated, there are provided relatively independent conveyors 31.

Each conveyor 31 includes a pair of chains 153, 153 which are connected together by apertured plate members 124b (see Figs. 11 and 12). The egg receiving cups 124 are made of soft, resilient rubber so as to constitute cushions for receiving the eggs without material danger of breaking the same. Each cup 124 is provided adjacent its front edge with an upstanding lip 124e which serves to prevent contacting of eggs in adjacent cups 124.

The conveyors 31 are independently actuated step-by-step each time an egg is delivered thereto, to advance the conveyor the necessary distance for bringing successive egg receiving cups or pockets into position for receiving an egg from the corresponding chute or guide 122. It will of course be apparent that it is important that each conveyor be so positioned that after each step of movement, an egg receiving cup or pocket 124 will be in accurate alignment with the corresponding chute 122. To attain such alignment, there is provided an automatic clutch and brake arrangement for controlling movement of each conveyor.

Figure 2:
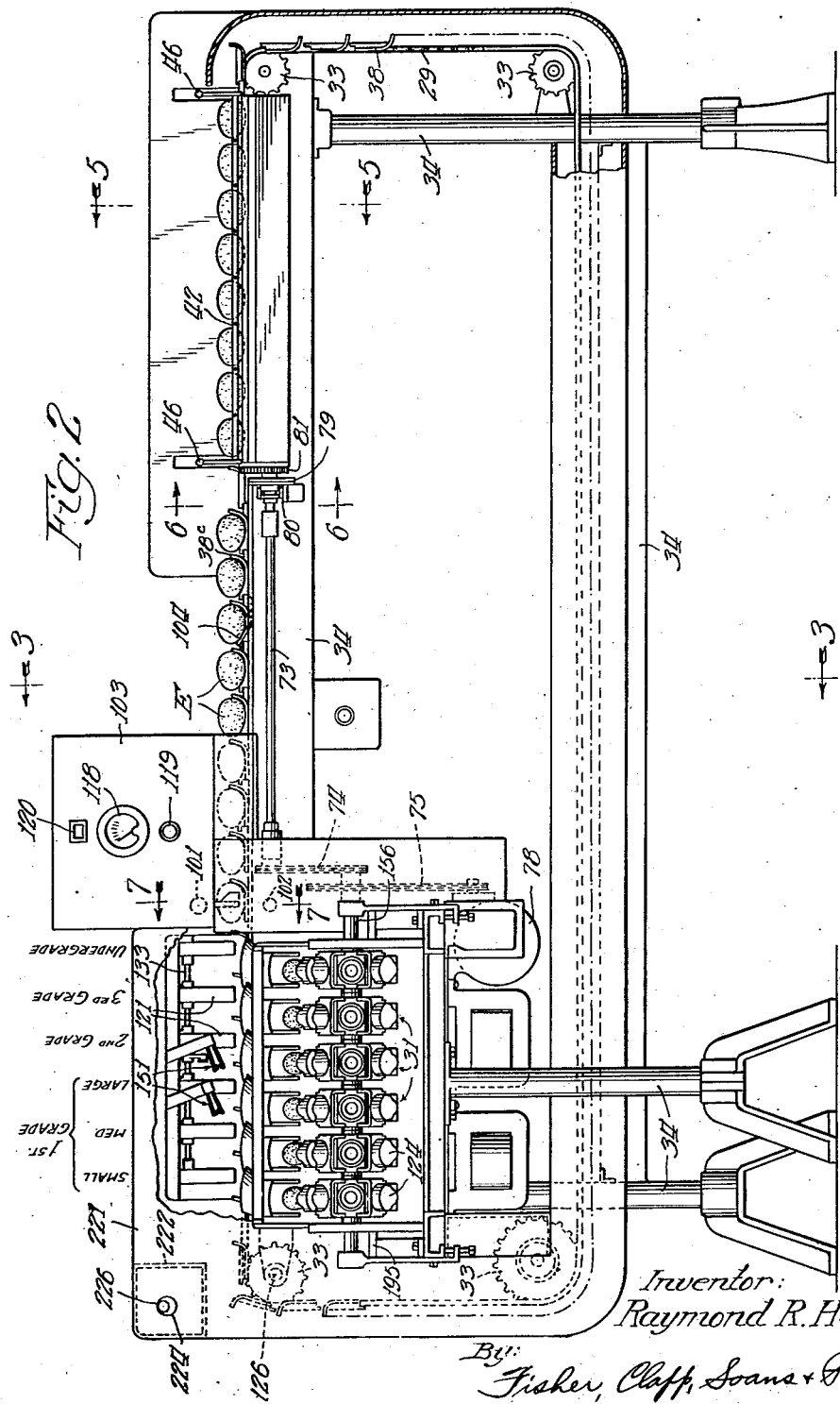
Fig. 2 is a front elevation of the left-hand side of Fig. 1.

The conveyors 31 are all driven from a shaft 152 which is driven by means of the electric motor 78 through the agency of the chain drive 75 which acts on a sprocket fast on the shaft 152 (see Figs. 2 and 3).

As best shown in Figs. 11, 12, 14 and 15, the conveyor chains 153, 153 extend around associated sprockets 154, 154 at one end and around similar associated sprockets 155, 155 at the other end. The sprocket pairs 154 and 155 are loose on the shafts 152 and 156 respectively, so that the conveyors are not continuously driven, although the shaft 152 is so driven.

With each conveyor 31 and with each pair of sprockets 154 for said conveyors, there is associated a clutch arrangement for drivingly engaging such sprocket pairs with the driven shaft 152.

Each sprocket 154 has a tight or pressed fit on a suitable bearing element 157 which is journaled on the shaft 152. Between the bearing elements 157 for the respective sprockets of each pair, there is located a cast iron core element 158 for an electro-magnetic coil 159 which is wound on said core. The core element 158 is keyed to the shaft 152 in any suitable manner so as to be driven by the said shaft. The core 158 is provided with end plates 160, 160 one of which may be made integral with the core and the other of which may be suitably secured thereto, as best suits manufacturing convenience. Of course, if it is desired, the end plates 160 may both be cast integral with the core 158 and the coil 159 wound on the core between such integrally formed end plates.

The bearings 157, 157 are each provided with flanges 161 intermediate their lengths and inwardly of said flanges there are located suitable iron members 162 which are designed to be attracted by the magnetic force of the electromagnet consisting of the parts 158, 159 and 160, 160. The plates 162 are freely movable on the inner end portions of the bearing members 157 and they are apertured at circumferentially spaced points as indicated at 163 to receive guide pins 164 which project inwardly from the respective sprockets 154. The guide pins 164 serve to permit the plates 162 to move toward and from the respective sprockets 154, while maintaining the said guide plates in otherwise fixed relation so that respective guide plates and sprockets must rotate as a unit. It will be seen that when the electro-magnetic structure is energized, the plates 162, 162 will be magnetically attracted by and held in fixed relation to the electro-magnetic structure which is keyed to the driven shaft 152. Accordingly, when the electro-magnet is energized, the sprockets 154, and thereby the associated conveyor chains, will be driven. For restoring the plates 152 to normal position, i. e., disengaged from the magnet, a plurality of flat spring members designated 165 are associated with each sprocket 154 and clutch plate 162. The springs 165 normally tend to bow outwardly and act through screws 166 to pull the respective clutch plates away from the magnet when the latter is not energized.

For energizing the magnetic clutch and its constantly rotating coil, one end of the coil winding is grounded in the mechanism and the other end is connected to a contact ring or commutator 167. The commutator 167 is insulated from the clutch mechanism by being mounted on spacer blocks 168 of insulating material, the latter being suitably secured, as indicated in Fig. 15, to a housing 169 which encloses the magnetic coil. The housing 169 is secured to the flanges or end plates 160, 160 of the electro-magnet preferably through the agency of brass segments 170 which may be brazed to the said end plates and to which the housing element may be secured by means of screws, as shown in Fig. 15. The segments 170, being of brass, are not transmitters of magnetic flux from the electro-magnet and hence tend to prevent the loss of magnetic energy by leakage from the magnetic end plates of the magnet to the housing member 169. By reference to Fig. 12, it will be seen that an electrical connection to the commutator ring 167 is made by means of a brush element 171 which is carried by a suitably mounted insulating material member 172.

The electrical control of the magnet clutch just described consists of switch or circuit breaking devices such as indicated at 173, one of which is associated with each egg guide or chute 122. By reference to Figs. 11 and 12, it will be seen that the contact breakers 173 consist of resilient metallic arms 174 which carry or control the position of a contact element 175 with respect to the position of another contact element 176 which is normally held in a fixed position. The resilient member 174 is provided with a rebent end portion 177 to move the resilient member 174 outwardly, thereby causing a separation of the contact points 175 and 176. By breaking a circuit controlled by contact elements 175 and 176, the magnetic clutch previously described will be energized.

It will of course be understood that the location of the switch mechanism 173 may be varied and that it may be actuated directly by engagement with the egg while on the conveyor 29 or in the chute 122, or that such switch mechanism may be actuated mechanically by any of the first five kickers when actuated, or by means of some moving part contributing to the actuation of said kickers. There is of course a definitely timed relation between the movement of the respective kickers and the required movement of the conveyors 31, so that variation of the location of the switches 173 is quite feasible.

The brake mechanism previously alluded to is more particularly shown in Figs. 16 and 17, to which reference is now directed. In the present instance, one of the sprockets 155 is made with a hub element 178 to which the other sprocket 155 is rigidly secured in any suitable manner. The sprockets 155 are mounted on the shaft 156 for rotation thereon and they are held against movement endwise of the shaft in a suitable manner, for example, by means of positioning collars 179 which may be pinned in place on the shaft 156. A ratchet-like element 180 is journaled on the hub 178 and is provided with an ear or lug 181 projecting laterally from one face thereof. The ratchet element 180 is designed to be held in fixed relation to the sprockets 155 through the agency of a collar 182 which is secured in fixed position on the hub 178 by suitable means, for example, a screw 183. The collar 182 is provided with a pair of lugs 184, 184 which respectively support set-screws 185, 185 which engage the opposite sides of the ratchet lug 181. By adjusting the screws 185, 185, it will be apparent that the circumferential position of the ratchet element 180 may be adjusted and held in predetermined relation to the sprockets 155, 155.

A plunger 186 having an anti-friction roller 187 at its outer end, is designed to engage the periphery of the ratchet element 180 and to normally hold the ratchet element and thereby the corresponding conveyor, in predetermined position of rest. The plunger 186 is normally urged to move outwardly by means of a solenoid coil 188 which acts on an armature 189 carried by a rod 190 which constitutes an extension of the plunger 186. A very light spring 191 disposed around the extension 190 and between the outer end portion of the core element 192 of the solenoid and an adjustable nut 193 on the extension, prevents undesirable outward displacement of the plunger 186 and armature 189 when the solenoid coil is de-energized. The spring 191 is of such small strength that it will not materially resist turning movement of the sprocket 183 when the solenoid coil 182 is deenergized. The plunger 186 is guided in a sleeve 194 which is carried by a cross bar 195 suitably mounted at its ends on conveniently located portions of the machine frame.

It will be seen that the described brake arrangement is normally effective to stop movement of the conveyor with the egg receiving cups in predetermined position, determined by the location of the low points or bottoms of the teeth of the ratchet 180. Because of the adjustable setting of the ratchet, it is of course possible to effect adjustment of the stationary position of the conveyor cups.

A modified form of clutch and brake device is illustrated in Figs. 18 and 19. The modified arrangement contemplates a unitary clutch and brake assembly which may be located at either end of each conveyor 31. In Figs. 18 and 19, a pair of sprockets 196, 196 correspond to a pair of sprockets 154 or a pair of sprockets 155. Such sprockets are mounted so as to be freely rotatable on a shaft 197 which is continuously driven and which, in this instance, may be considered as corresponding with the driven shaft 152. The sprockets 196, 196 are respectively secured to flange portions of bearing elements or hubs designated 198, 198 and each bearing element or hub is equipped with an inwardly extending reduced diameter portion 199. Between the inner ends of the bearing portion 199, there is located a coil spring 200, the latter being wound around the shaft 197 and being of such size that the shaft may rotate within the spring. One end of the coil spring 200 is anchored in a notch indicated at 201 provided in an extension 202 of a gear member 203, the latter being rotatable on the portion 199 of one of the bearing members 198. The other end of the spring 200 is anchored in a notch or aperture 204 provided in the hub extension 205 of a ratchet element 206 which is journaled on the portion 199 of the other bearing element 198.

One of the sprockets 196 is provided with a plurality of, in this instance seven, radially extending guideways designated 207, the said guideways being arranged in uniform angular relation to each other and being adapted to receive successively one of three devices, in this instance rollers, 208 which are carried by a gear 209. The gear 209 is mounted on a stub shaft 210 which is carried by a bracket 211 mounted on a conveniently located frame element. The gear 209 meshes with gear 203 and is driven thereby so that the rollers 208 are successively caused to engage the guideways 207 of the sprocket 196. A ratchet-engaging element or hook 212 is journaled on or secured to one end of the stub shaft 210, the said hook member having a hook or ear element 213 which is designed to successively engage the teeth 214 of the ratchet member 206. The hook member 212 is controlled by an electro-magnet or solenoid 215 which acts through a plunger 216 having its outer end pivotally connected as indicated at 217 to the free end of the hook member.

The coil spring 200 is normally held in slightly opened or unwound condition. Under normal conditions, one end of the coil spring is held against movement by the ratchet element 206 and locking hook 212. The frictional resistance to movement of the entire conveyor, transmitted through the guideway 207 to the gears 210 and 203, is too great to permit movement of the other end of the coil spring from its slightly unwound condition. However, when the solenoid 215 is energized and the hook element 212 moved out of the way of the ratchet 206, the coil spring 200 may then easily close itself by simply effecting slight turning movement of the ratchet element 206. When the coil spring 200 closes itself, it grips the driven shaft 197 and thereby becomes a driven element. Rotation of the spring is then transmitted to the gear 203 and from the latter to the gear 209 and rollers 208. A roller 208 acting in one of the guides 207 then serves to impart limited rotary movement to the sprocket 196 on which the guides 207 are formed, thereby to effect advance movement of the conveyor 31.

In the present instance, it is contemplated that the sprockets 196 will be rotated through only one-seventh of a revolution for each advance movement of the conveyor. This is accomplished by the described relationship of the rollers 208 and guides 207 and by effecting one-third of a revolution of the gear 209 each time the hook element 212 frees the ratchet 206. In the present instance, the gear 203 is provided with forty teeth, while the gear 209 is provided with sixty teeth, so that one-half turn of the gear 203 will effect one-third of a turn of the gear 209. Since the ratchet element 206 offers no material resistance to closing of the spring 200, it will be seen that the ratchet element 206 will also be driven by the spring 200 and the shaft 197. When the shaft 197 and ratchet element 206 have completed one-half turn, the hook element 212 engages the next, or second, tooth 214 of the ratchet 206, to thereby stop rotation of the ratchet element 206 and thereby to effect unwinding of the spring 200 and disengagement thereof from the shaft 197. In this manner, driving engagement of the shaft 197 is stopped. It will be seen that the solenoid 215 need be only momentarily energized, that is, sufficient to withdraw the ratchet stop 213 from the ratchet tooth 214 until the latter passes the said stop. A coil spring 216ª serves to return the pawl to engagement with the ratchet. It will be seen that the extent of movement of the conveyor is limited by the travel of the roller 208 in a guideway 207. Also, the disclosed arrangement of three rollers 208 for successively acting in a series of seven guideways, is advantageous, in that uniformity of wear will result, since no one roller always acts in one particular guideway. Also, it will be noted that because of the location of two of the rollers 208 at the outer ends of a pair of guideways 207, when the conveyor is stationary, will constitute an effective means for locking the conveyor against movement and also an effective means for definitely positioning the conveyor so that its cups may be properly located with respect to the egg delivery chute. Another important advantage of the structure shown in Figs. 18 and 19 is that movement of the conveyor receives a slow and gentle start, is gradually increased to a high point, and then gradually decreases to the stopping point. Thus jerkiness and consequent strains on the mechanism are avoided.

In connection with the graded egg receiving conveyors, and particularly in connection with those for the first and second grade eggs, there may be provided additional means for affording a final visual inspection of the eggs. Such means is shown particularly in Fig. 3 as including a series of electric lamps designated 218 which are located under the stationary position of the egg receiving cups 124. As shown, six lamps are respectively located under six of the egg receiving cups and the lamps are located in a casing element 219 provided with light emitting openings 220 adapted to permit the passage of light upwardly through the egg receiving cups 124 and through the egg positioned therein. By reference to Fig. 12, it will be seen that said egg receiving cups are provided with apertures as indicated at 124ª in their bottoms and that the cups are mounted on plates 124ᵇ which are respectively secured by means, such as ears 124ᶜ formed integral therewith, to properly located links of the conveyor chain. The beams of light from the lamps 220 extend upwardly through the openings 124ª and through the eggs disposed in the respective cups, so that an operator located at that end of the machine may recheck the eggs for various defects.

As previously indicated, no two egg candlers judge the same group of eggs in exactly the same manner, and an egg which will pass inspection as a first grade egg by one candler, may be considered very doubtful by another. To facilitate further visual inspection of eggs considered questionable by an operator of the machine located at the graded egg receiving conveyor, there is provided an improved candling light preferably located in the housing designated 221, which encloses mechanism for actuating the kickers which discharge the eggs from the conveyor 28 into the chute 122. By reference to Figs. 1 and 2, it will be seen that in the unoccupied upper left-hand corner of the said casing 221, there is provided a partition 222 which encloses an electric lamp 223 which may be manually controlled by a suitably located switch. In the front of the casing 221, there is provided an aperture 224 in which eggs are adapted to be positioned substantially in the same manner that eggs are positioned in the opening of conventional candling devices. Spaced rearwardly from the front wall of the casing element 221 and hence spaced rearwardly from the egg opening 224, there is provided another partition element 225 which is provided with a smaller opening 226, the latter being located in alignment with the upper portion only of the egg positioning opening 224. By the described arrangement of openings, it is found that ample light is passed into the egg to provide for visual inspection and that the tendency for bothersome light rays to escape between the egg surface and opening is almost entirely eliminated. This appears to be due to the elimination of light rays on surface portions of the egg which would normally reflect such rays into the eyes of the candler, and also to the elimination of light reflecting surfaces around the openings through which light passes from the interior of the lamp chamber into the egg.

Electric circuits

In the electric circuit diagram shown in Fig. 20, it is indicated that the main source of power is 110 volts alternating current, which enters a rectifying and amplifying unit. The latter unit is of a type which supplies, in this instance, three relatively independent currents and also embodies connections whereby a circuit, including the photo-electric cell 101, will affect the strength of one of the output circuits. In this instance, it is contemplated that the photo-electric cell 101 will be operative to control the strength of the circuit designated A. The circuit A is grounded as indicated at A¹ and the circuit designated B is also grounded, as indicated at B¹.

Forming part of the electrical equipment of the machine, are a number of relays designated R¹, R², R³, R⁴ and R⁵. The relays R¹, R² and R³ each include, in effect, a pair of movable switch arms designated 231 and 232 respectively, these arms being adapted to be moved under the influence of electro-magnets designated 230. The relay R⁴ includes a single movable arm designated 233 which is adapted to be swung between contact points as indicated, by an electro-magnet designated 235. The relay R⁵ includes an electro-magnet 236 which is designed to control a swinging switch arm 237 between opposed contact points, as illustrated.

The distributing motor switch 116 comprises six relatively independent units which are grouped into three pairs. One pair is associated with each of the "under grade", "third grade" and "second grade" egg kickoff devices 121. Each distributing switch unit also includes an arm 238 carried by a shaft 239 but insulated therefrom, and the shaft 239, which is common to all of the distributor arms, is equipped with a ratchet wheel designated 240. The shaft 239 is adapted to be rotated step-by-step through the agency of such means as typified by a lever 241 pivoted intermediate its ends as indicated at 242 and provided at one end with a spring pressed pawl 243 designed to engage the teeth of the ratchet 240. The other end of the lever 241 is arranged to be attracted by the magnet 236 forming part of the relay R⁵ and to be normally held away from the magnet by a spring 244. It will be seen thrat the arrangement just explained is such that when the relay magnet 236 is energized, the arm 241 will be swung in such a direction that the pawl 243 rides over and engages a new ratchet tooth and that when the magnet 236 is de-energized, the spring 244 will turn the arm 241 and through the pawl 243, turn the ratchet 240 and shaft 239 through one step of rotation.

Another motor switch designated 245 (see also Fig. 1) serves to rotate a switch arm 246 step-by-step under certain conditions, as will be explained.

According to the plan of operation of the described mechanism, eggs which cause the passage of an electric current of less than 31 milliamperes through the photo-electric cell are considered "under grade." Eggs which cause the passage of a current of 31 and up to (but not including) 34 milliamperes, are "third grade." Those which cause the passage of 34 and up to 39 milliamperes are "second grade," and those which cause the passage of 39 or more milliamperes are considered "first grade."

The coils 230 in relays R¹, R² and R³ are respectively wound to be actuated by currents of not less than 31, 34 and 39 milliamperes. Relay R⁵, which controls the counting mechanism, is provided with a coil wound so as to be actuated by all currents which are of 31 milliamperes or greater strength. Eggs of "under grade" rating do not cause the passage of as much as 31 milliamperes and hence are not counted by the counting mechanism.

Assuming first that an egg of "under grade" rating is inspected, a current of less than 31 milliamperes will be caused to flow through the circuit designated A. The current will flow through the line including the milliammeter 118, through the arm 237 of relay R⁵ and will return through the windings of the coils 230 of relays R¹, R², R³ and R⁴ but without actuating any of the latter.

An electric current in circuit designated B will flow through the line following the points designated a, b, c, d and e to the distributer arm 238 of the first pair of distributer motor units. In the position illustrated, the arm 238 of the first distributer unit is in circuit with a condenser designated C¹ which will thereby be charged.

The switch arm 237 of the relay R⁵ is held in the position shown for measuring the current of circuit A when the coil 236 is energized. The circuit in which coil 236 is incorporated is controlled by a mechanically operated timer designated 247, which is associated with the shaft 126 (see Figs. 12 and 13).

The timer switch includes a pivoted arm 248 which is rocked on its pivot by a cam 249, a suitable spring 250 being provided for causing the arm to follow the cam. The cam 249 is mounted on an extension of the shaft 126 and the arm 248 is mounted in a housing 251 which is suitably supported by being connected to an adjacent bearing or frame element. Contact points 252 and 253 are caused to engage and disengage in accordance with the movement of the arm 248. It will be observed that the cam 249 is rotated in definitely timed relation to the travel of the conveyor 29, since the cam and one of the conveyor sprockets are on the same shaft. Each time contact is made between the contact points 252 and 253, a circuit is completed to energize the coil 236. When the coil 236 is energized, the relay arm 237 is held in the position given in the diagram so that the photo-electric-cell-controlled currents in circuit A will be measured. When the coil 236 is de-energized by the separating of the timer contacts 252 and 253, the arm 237 is swung into engagement with its other contact point which is grounded as indicated, so that a complete circuit is maintained through the amperemeter at all times, regardless of the position of the timer switch. This arrangement prevents excessive swinging or vibrating of the indicating needle of the milliampermeter 118 and thereby makes accurate reading of the milliamperemeter 118 possible.

When the coil 236 of relay R⁵ is energized, it also initiates one step of rotation of the shaft 239 in the manner above explained.

Charging of the condenser C¹ occurs at the time the "under grade" egg is being inspected. The zone of operation of the first ("under grade") kickoff arm 121 is spaced from the inspecting zone a distance which is equal to the distance the conveyor chain 29 travels for each step of rotation of the distributer switch arm, in this instance, approximately three inches.

The operation of the timer, and thereby the operation of the distributer switch arm, are so synchronized with the movement of the conveyor 29 that when the egg inspected by the photo-electric cell reaches the zone of operation of the "under grade" kicker arm 121, the distributer arm 238 of the second unit of the first pair, will be advanced one step so as to be in circuit with the charged condenser C¹. The charge of said condenser C¹ will then be connected through the solenoid magnet 146 of the "under grade" kickoff mechanism to thereby actuate the latter whereby the "under grade" egg will be duly discharged to the proper receiving conveyor 31.

In the diagram, the solenoid coils 146 of the kickoff devices are indicated as having one side grounded and the grounded sides are designated by primed reference letters which are also used to designate the grounded sides of condenser from which the charge is obtained for actuating the respective coils. Other grounded points which are included in the same circuits are similarly designated by like primed reference letters.

In the event that the egg following an "under grade" egg is also an "under grade" egg, the same electric circuits will be employed, except that because of the advancement of the distributer switch arm 238, the condenser $C^1$ will be out of the circuit, but another, similar condenser $C^2$ will be employed.

Distributer switches such as referred to are available on the market as a stock product and the preferred structure for present purposes embodies six units which are divided into three pairs. One unit of each pair may be referred to as the charging unit and the other unit of each pair may be referred to as the discharging unit. The said stock distributer switch product embodies, in each unit, 25 separate contact points. To avoid the use of 25 separate condensers (which would be expensive and cumbersome), the 25 contact points of each unit are connected into five sets of five contact points each. Such connections are represented in Fig. 21 where one pair of switch units are represented, each unit having its contact points connected in five sets of five points each. As indicated, the contact points $S^1$, $S^6$, $S^{11}$, $S^{16}$ and $S^{21}$ of the switch unit $S^c$ are interconnected and connected with the condenser $C^1$. Similarly, contacts points $S^2$, $S^3$, $S^4$ and $S^5$ are connected in series with every fifth contact point therebeyond and with the respective condensers $C^2$, $C^3$, $C^4$ and $C^5$. Since the switch unit $S^d$ is relied upon for effecting discharge of the condensers $C^1$ to $C^5$ inclusive at a time subsequent to the time of charging, i. e., when the inspected egg has moved from the inspecting zone to the "under grade" kickoff zone, condensers $C^1$, $C^2$, $C^3$, $C^4$ and $C^5$ are respectively connected to contact points $S^2$, $S^3$, $S^4$, $S^5$ and $S^6$ of the discharge switch unit $S^d$. Hence by the time the egg which caused charging of the condenser $C^1$ has been propelled to the zone of operation of the "under grade" kickoff, the switch arm of the discharge switch unit will contact the point $S^2$ of the discharge switch unit and hence conduct the charge of condenser $C^1$ to the "under grade" kickoff operating coil. The time of discharge of the other condensers $C^2$, $C^3$, $C^4$ and $C^5$ is similarly delayed one point which corresponds to the time required for the egg to travel from the inspecting zone to the kickoff operating zone. By the arrangement indicated, the condensers $C^1$ to $C^5$ inclusive will be successively included in circuits subject to operation in accordance with the quality of eggs inspected.

When an "under grade" egg is inspected, the counting mechanism will not be actuated, since the relay $R^4$ will not be affected by the current which is less than 31 milliamperes. As indicated, the circuit B which passes through one contact point of the relay $R^4$, and through the switch arm 233 thereof, enters a condenser designated $C^{16}$, one side of which is grounded. So long as the current remains grounded, the coil 254 of the counter operating motor will not be energized and hence the counter switch arm 246 will not be moved. However, when the current caused to flow through circuit A is 31 or more milliamperes, the coil 235 of relay $R^4$ will be energized and the relay switch arm 233 caused to make contact with the contact point which is in circuit with the coil 254 of the counter motor. Under the latter condition, current stored in condenser $C^{16}$ will energize the coil 254, one side of which is grounded, so as to advance the counter arm one step.

It is preferred that eggs be counted in batches of say 50 and hence the switch arm 246 is arranged to engage a contact point only once for every 50 steps of movement imparted to it. When the arm so engages a contact element, a circuit is completed through the counter unit 120 to indicate the completed inspection of a predetermined number of eggs. Of course the counting mechanism may be arranged to indicate other quantities of eggs, for example, dozen or case lots, or even to count single eggs.

Assuming now that a "third grade" egg passes under the photo-electric cell, a current of from 31 up to 34 milliamperes will pass through the circuit A. Relays $R^1$ and $R^4$ will then be actuated. When relay $R^1$ is actuated, switch arms 231 and 232 thereof are swung over to make contact with other lines as indicated. Switch arm 231 of relay $R^1$ then serves to ground the condenser $C^1$ (or whichever one of condensers $C^1$ to $C^5$ inclusive is then in the circuit), thereby preventing energization of the "under grade" knickoff operating coil 146 by that condenser. Switch arm 232 of the relay $R^1$ then transmits the current in circuit B to the switch arm 232 of the relay $R^2$ which is then in position to direct the current of said circuit B to condenser $C^6$ (or whichever one of condensers $C^6$ to $C^{10}$ inclusive is then in circuit) so as to charge that condenser.

Since "third grade" eggs are not discharged from the conveyor 29 until they travel beyond the "under grade" kickoff, i. e., two stages of travel beyond the inspecting point, instead of one stage as for "under grade" eggs, the condenser discharging switch unit of the second set or pair of switch units is connected to the condensers two steps later, instead of one step later, as explained for "under grade" eggs. Hence when the discharge switch unit of the second pair is moved through two steps of movement, the "third grade" egg kickoff will be actuated and the "third grade" egg thereby delivered to its appropriate receiving conveyor 31. Successive "third grade" eggs similarly affect the other condensers of the series $C^6$ and $C^{10}$ inclusive.

As previously indicated, when a third or better grade egg is inspected, the current passed through the photo-electric cell is sufficient to cause operation of the coil 235 of the relay $R^4$, whereby the counting mechanism will be actuated.

Assuming now that a "second grade" egg is inspected, the current passed by the photo-electric cell will be over 34 but less than 39 milliamperes. In that case, in addition to the counter actuating relay $R^4$, relays $R^1$ and $R^2$ will also be actuated, with the result that charges in any of the condensers $C^1$ to $C^{10}$ inclusive will be grounded and the B circuit current conducted to one of the condensers $C^{11}$ to $C^{15}$ inclusive. Since "second grade" eggs are discharged three steps beyond the inspecting point, the connections to the discharge switch unit contact points for condensers $C^{11}$ to $C^{15}$ inclusive are correspondingly offset with respect to the same connections to the charging switch unit. Discharging of any one of the condensers $C^{11}$ to $C^{15}$ inclusive through the discharge switch distributer arm energizes the solenoid coil 146 of the "second grade" kickoff device to correspondingly effect discharge of the "second grade" egg to its appropriate receiving conveyor 31.

When a "first grade" egg is inspected, a current of 39 or more milliamperes is caused to flow in the circuit A. In that case, the relays $R^1$, $R^2$, $R^3$ and $R^4$ are actuated. Hence the "first grade" egg is registered on the counter and the electric charges of any of the condensers $C^1$ to $C^{15}$ are discharged through the grounded connections of the relays $R^1$, $R^2$ and $R^3$ as indicated. Hence none of the three lower grade kickoff devices will be actuated. Discharge of the "first grade" eggs will then be controlled only by the size of the egg, as previously explained. The electric circuits involving the discharge of eggs according to size requires no timing arrangement other than proper positioning of the contact devices 151. The circuits controlled by egg size are accordingly ordinary simple circuits which need not be illustrated or explained in detail.

Electric clutch and brake circuit

The electric circuits of the electric clutch and brake shown in Figs. 14 to 17 inclusive are diagrammatically illustrated in Fig. 22.

The brake solenoid 188 is normally energized so as to yieldingly apply the brake. When an egg engages the member 177 and thereby separates the contacts 175 and 176, the circuit through the magnetic coil 255 of a relay $R^6$ is broken, thereby permitting a spring 256 to swing the relay switch arm 257 over to engage a contact point so as to establish a circuit through the coil 159 of the clutch. The brake coil circuit is of course broken simultaneously with the making of the clutch coil circuit. When the brake coil circuit is broken and the clutch coil circuit made, the corresponding conveyor 31 will be advanced.

The extent of advancement is governed by the length of time the egg holds the contacts 175 and 176 separated. Accordingly, the element 177 is made of such length (in the direction of travel of the conveyor 31) as to enable the egg to maintain said contacts separated for the length of time necessary to effect sufficient movement of the conveyor to carry the egg out of alignment with the chute 122 and to carry an empty cup 124 into such alignment.

The formation of the ratchet wheel 180 is of course such that the conveyor will be stopped so as to accurately position an empty cup in said alignment and also such that the pressure exerted thereon by the plunger 186 tends to insure its turning movement until a proper stopping point is reached.

The egg controlled switch elements 175, 176 and 177, relay $R^6$, and brake and clutch coils 188 and 159 indicated in the digram (Fig. 22) respectively represent those parts which apply to one conveyor unit 31. For each conveyor unit 31, the said parts are duplicated and supplied with current from the same source as indicated in Fig. 22.

It will be seen that the inspection of eggs made possible with the above described mechanism eliminates errors of judgment and produces a very definite egg grade basis. Of course eggs which are very plainly below grade may be detected by the operator at the feeding end of the mechanism, and in such case may be manually removed and replaced with other eggs. However, even though an egg be removed and not replaced, the operation of the machine is not interfered with, since the absence of an egg from one position on the conveyor 29 will not cause stoppage of the machine or otherwise hinder its continued operation.

The inspection which is mainly relied upon in the mechanism is of course the photo-electric cell inspecting arrangement, and this means is entirely automatic and not subject to errors in judgment such as are well known to cause questionable grading at the hands of egg candlers.

The separation of the eggs into their distinct grades and their delivery to the receiving conveyors 31 is such that the pockets of the respective conveyors are successively filled. In other words, the eggs in each grade are delivered in continuous rows so that when an operator is removing and packing eggs from the respective conveyors 31, it is convenient to grasp a predetermined number, for example, three eggs in each hand, and to place such eggs in a carton, case or other container. It will also be observed that the eggs are uniformly delivered with their pointed ends down, so that in the final packing, the eggs appear with their large or blunt ends up. This arrangement produces the most attractive package which merchandisers consider desirable from a sales standpoint. The delivery of eggs in this particular manner is dependent only upon the care of the operator at the egg receiving end of the machine, it being only necessary that such operator place the eggs point foremost in the rack 25.

In the practical operation of the machine, it has been found that an average operator at the starting end of the machine is capable of placing as many as 12 eggs in the pockets of the reciprocating rack for each feed movement of the rack. However, for practical purposes, and to afford such operator a better opportunity for visual inspection of the eggs, it is contemplated that a rack having a capacity of 8 eggs (as shown) will be adequate. Of course the speed of operation of the machine may be controlled by varying the speed of travel of the egg conveyor 29, and it is apparent that the speed of operation, within practical limits, need be restricted only in accordance with the ability of the operators to feed and remove eggs to and from the machine.

Changes in the described construction may be made without departing from the spirit of the invention, the scope of which should be determined by reference to the following claims, the same being construed as broadly as possible consistent with the start of the art.

I claim as my invention:

1. In an egg candling device, the combination of a conveyor for propelling a row of eggs, means for projecting a beam of light successively through the eggs on said conveyor, a photo-electric cell positioned so as to be acted upon by light rays passing through said eggs and to thereby cause the flow of electric currents of strengths dependent upon the intensity of light passing through the respective eggs, means for temporarily storing the currents so caused to flow through said photo-electric cell, and a plurality of devices for discharging eggs from said conveyor at different points in accordance with the intensity of light passed through the respective eggs, means actuated by electric currents of different strengths for selectively actuating said discharge devices, and means for transmitting said stored-up currents to actuate said discharge devices at times subsequent to the time when said currents are caused to flow through said photo-electric cell.

2. In an egg candling machine, the combination of a conveyor for propelling eggs arranged in a row, and means for discharging eggs from said conveyor comprising a kicker, a rock shaft, said kicker being journaled on said shaft for rocking movement thereon, means for rocking said shaft, a finger projecting from said rock shaft in fixed relation thereto, an arm rigidly connected to said kicker and extending from said rock shaft adjacent said finger, a pin mounted in said arm extension for sliding movement transversely of the arm and into and out of the path of said finger, means for normally maintaining said pin in predetermined position out of the path of movement of said finger, and means for effecting movement of said finger into said path of movement to thereby effect rocking movement of the kicker in unison with the rocking movement of said finger.

3. In an egg candling machine, the combination of an egg feeding conveyor adapted to advance a row of eggs longitudinally, a single photoelectric device associated with said feeding conveyor for successively determining the grade of all of the eggs on said conveyor, a plurality of receiving conveyors respectively adapted to receive eggs of different grades from said feeding conveyor, clutch means associated with each of said receiving conveyors, means actuated by the eggs fed to the respective receiving conveyors for controlling said clutch means to advance the respective receiving conveyors a predetermined distance each time an egg is fed thereto, and a plurality of devices, all controlled by said single photo-electric device, respectively associated with said receiving conveyors and all associated with said feeding conveyor for effecting discharge of the eggs from said feeding conveyor to the respective receiving conveyors.

4. In an egg candling machine, the combination of an egg feeding conveyor comprising a plurality of egg carriers uniformly spaced longitudinally of the direction of travel of the conveyors, a plurality of receiving conveyors arranged to travel transversely of the direction of travel of said feeding conveyor, said receiving conveyors being spaced transversely of each other uniform distances having predetermined relationship to the spacing of said carriers, a plurality of devices respectively associated with said receiving conveyors and with said feeding conveyor for transferring eggs from said feeding conveyor to the respective receiving conveyors, a photo-electric device associated with said feeding conveyor for successively determining the grading of the eggs carried thereby, and means controlled by said photo-electric device for selectively actuating said transferring devices.

5. In an egg candling machine of the class described, the combination of a continuously traveling conveyor for propelling eggs substantially in the direction of their lengths, a second conveyor for receiving the eggs from said first-mentioned conveyor, said second conveyor extending transversely of and being disposed in a plane lower than the plane of movement of said first-mentioned conveyor, a device associated with said first-mentioned conveyor for discharging eggs therefrom in a direction transverse of the direction of travel of said first-mentioned conveyor, said device being disposed in advance of the point of delivery of eggs to said second conveyor, and means for receiving the eggs discharged by said device, turning them to substantially axially vertical position and delivering the same in said position to said second conveyor, said means comprising an inclined element for receiving the eggs and guiding the same laterally at least partially in the direction of travel of said first-mentioned conveyor and downwardly, and a depending member for conducting the eggs downwardly from said inclined element to said second conveyor, the eggs being turned by gravity from axially horizontal position in which they are received on said receiving element to said axially vertical position when moving from said receiving element to said depending member, the arrangement being such that the travel of the eggs is substantially continuous.

RAYMOND R. HAUGH.